US012677041B2

(12) United States Patent
Gupta et al.

(10) Patent No.: US 12,677,041 B2
(45) **Date of Patent: *Jul. 7, 2026**

(54) SYSTEMS AND METHODS FOR DYNAMICALLY SYNCING FROM TIME-SHIFTED FRAME TO LIVE STREAM OF CONTENT

(71) Applicant: Adeia Guides Inc., San Jose, CA (US)

(72) Inventors: Vaibhav Gupta, Bangalore (IN); Ashish Gupta, Bangalore (IN); Rohit Dhiman, Haridwar (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/924,154

(22) Filed: Oct. 23, 2024

(65) Prior Publication Data

US 2025/0159299 A1     May 15, 2025

Related U.S. Application Data

(63) Continuation of application No. 18/230,876, filed on Aug. 7, 2023, now Pat. No. 12,160,640, which is a continuation of application No. 17/114,027, filed on Dec. 7, 2020, now Pat. No. 11,770,588.

(51) Int. Cl.
| | |
|---|---|
| *H04N 21/2187* | (2011.01) |
| *H04N 21/43* | (2011.01) |
| *H04N 21/472* | (2011.01) |
| *H04N 21/845* | (2011.01) |

(52) U.S. Cl.
CPC ... *H04N 21/47217* (2013.01); *H04N 21/2187* (2013.01); *H04N 21/4302* (2013.01); *H04N 21/8456* (2013.01)

(58) Field of Classification Search
CPC ...................... H04N 21/8549; H04N 21/2187
See application file for complete search history.

(56) References Cited

U.S. PATENT DOCUMENTS

| | | |
|---|---|---|
| 7,761,892 B2 | 7/2010 | Ellis et al. |
| 9,009,066 B2 | 4/2015 | Long et al. |
| 9,743,125 B2 | 8/2017 | Brand |

(Continued)

FOREIGN PATENT DOCUMENTS

| | | |
|---|---|---|
| EP | 2775731 A1 | 9/2014 |
| WO | 2011/075016 A1 | 6/2011 |
| WO | 2016/057844 A1 | 4/2016 |

*Primary Examiner* — Michael H Hong
(74) *Attorney, Agent, or Firm* — HG LAW LLP

(57) ABSTRACT

Systems and methods for dynamically skipping a presentation of a portion of frames to catch up to live based on a user selection is disclosed herein. For example, a streaming application generates a content item for live streaming where the content item comprises a plurality of frames. In response to determining that playing of the content item lags behind the live streaming of the content item, the streaming application presents a selectable option for a user input where the option comprises (a) catch up to live in a particular time period. In response to receiving the user input via a corresponding option to (a) catch up to live in the particular time period, the streaming application skips a presentation of a portion of the plurality of frames, such that the playing of the content item catches up to live in the particular time period.

20 Claims, 15 Drawing Sheets

(56)            References Cited

U.S. PATENT DOCUMENTS

| | | | |
|---|---|---|---|
| 10,116,722 B2 | 10/2018 | Hurst et al. | |
| 10,298,643 B1 | 5/2019 | Toal et al. | |
| 10,708,662 B1 | 7/2020 | Bourgoyne | |
| 11,490,153 B2 | 11/2022 | Gupta et al. | |
| 11,490,167 B2 | 11/2022 | Gupta et al. | |
| 11,627,364 B1 | 4/2023 | Gupta et al. | |
| 11,770,588 B2 | 9/2023 | Gupta et al. | |
| 12,160,640 B2 | 12/2024 | Gupta et al. | |
| 2005/0132401 A1 | 6/2005 | Boccon-Gibod et al. | |
| 2007/0300249 A1 | 12/2007 | Smith et al. | |
| 2010/0205049 A1 | 8/2010 | Long et al. | |
| 2013/0238740 A1 | 9/2013 | Vass et al. | |
| 2013/0347047 A1 | 12/2013 | Tanaka | |
| 2015/0074732 A1 | 3/2015 | Green et al. | |
| 2016/0005440 A1 | 1/2016 | Gower et al. | |
| 2016/0105734 A1 | 4/2016 | Packard et al. | |
| 2016/0308934 A1 | 10/2016 | Gholmieh et al. | |
| 2016/0323610 A1 | 11/2016 | Lin | |
| 2017/0272818 A1 | 9/2017 | Gattis et al. | |
| 2017/0353519 A1* | 12/2017 | McLeod | H04L 65/612 |
| 2017/0353747 A1 | 12/2017 | Thomas et al. | |
| 2018/0262805 A1 | 9/2018 | Grouf et al. | |
| 2020/0045384 A1 | 2/2020 | Nilsson | |
| 2020/0128306 A1 | 4/2020 | Jackson et al. | |
| 2022/0182710 A1 | 6/2022 | Gupta et al. | |
| 2022/0182724 A1 | 6/2022 | Gupta et al. | |
| 2022/0182731 A1 | 6/2022 | Gupta et al. | |
| 2023/0099433 A1 | 3/2023 | Gupta et al. | |
| 2023/0379547 A1 | 11/2023 | Gupta et al. | |

* cited by examiner

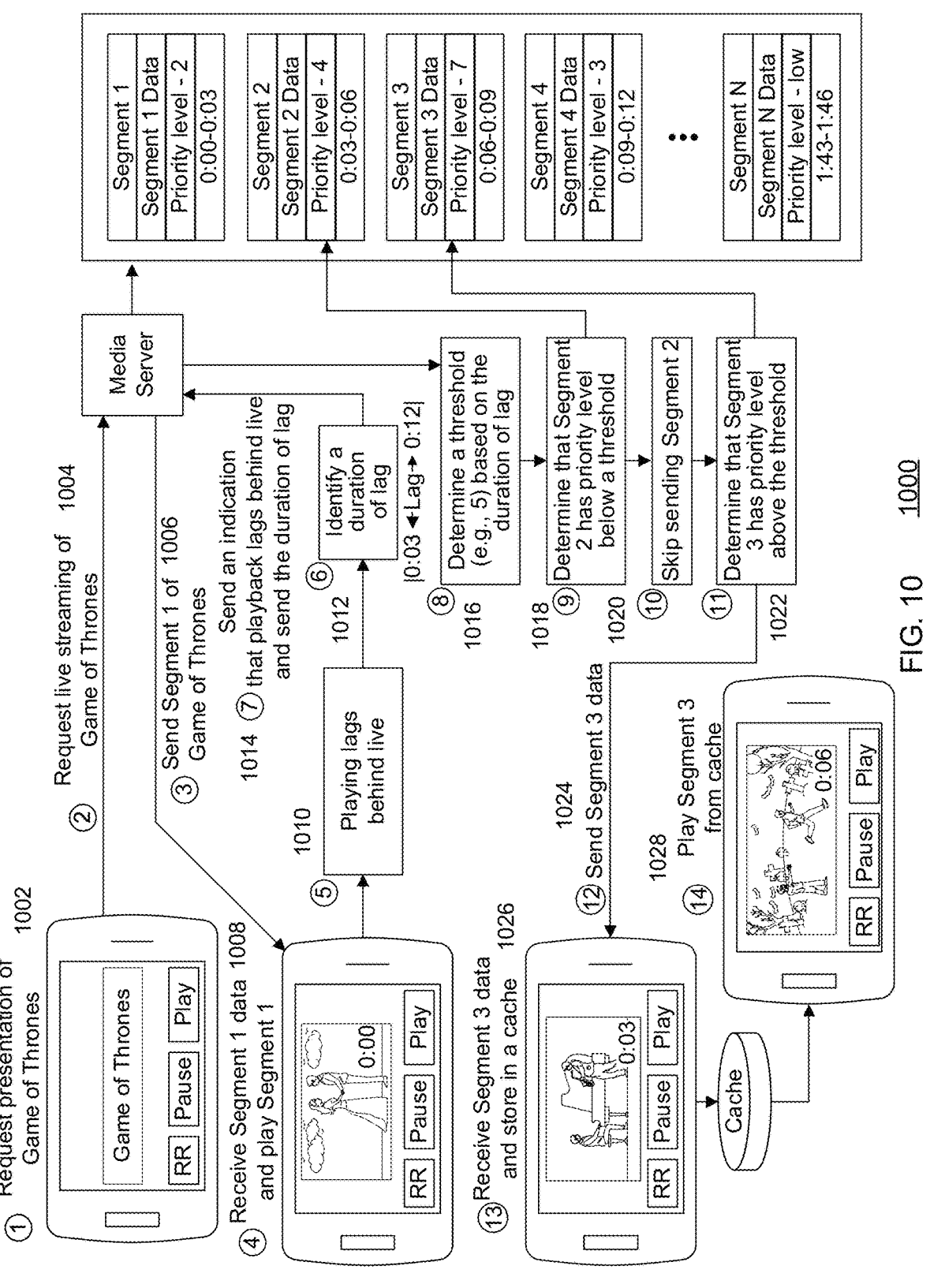
FIG. 10    1000

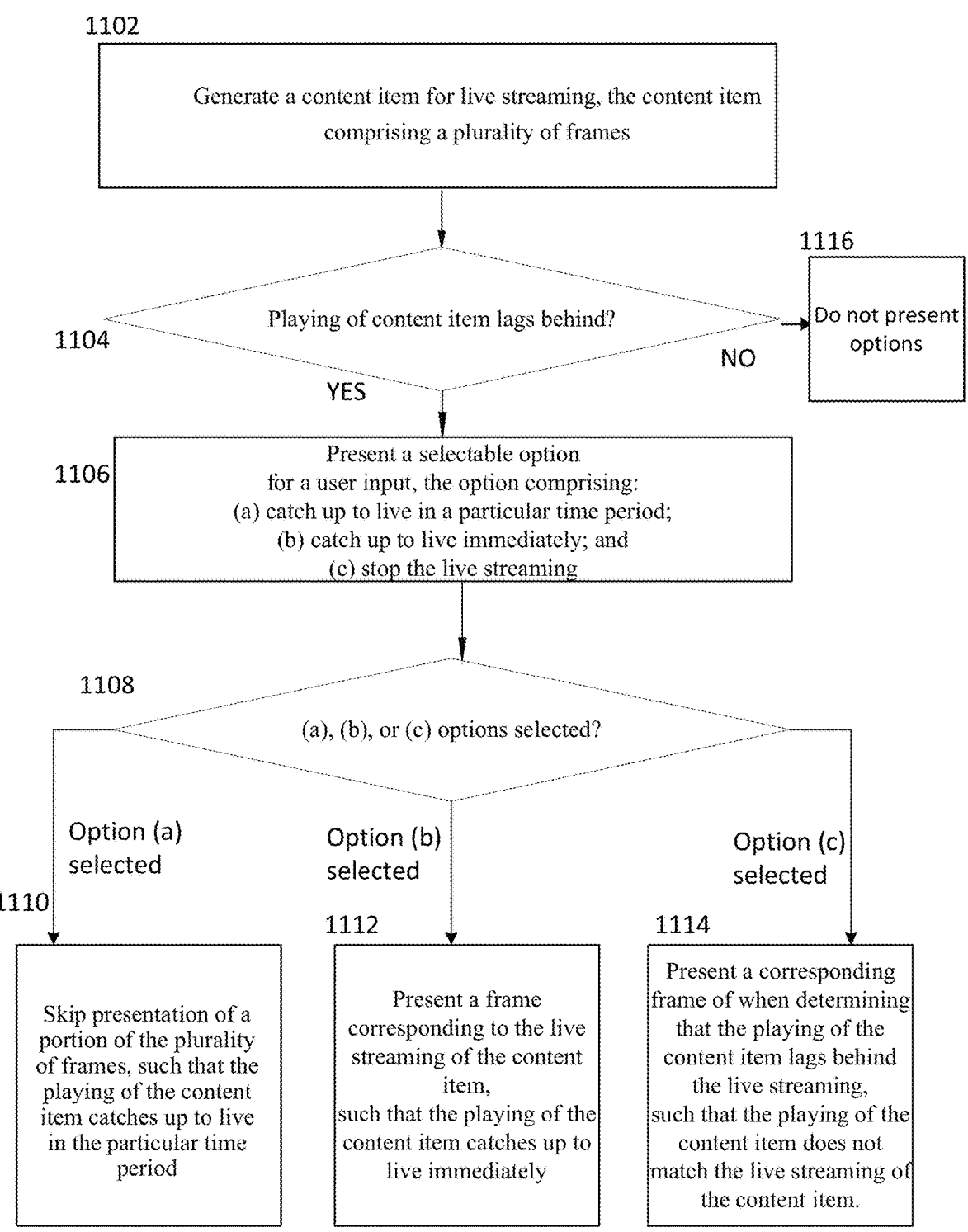

1102

Generate a content item for live streaming, the content item comprising a plurality of frames 1104          Playing of content item lags behind?          1116

NO          Do not present options

YES

1106          Present a selectable option
for a user input, the option comprising:
(a) catch up to live in a particular time period;
(b) catch up to live immediately; and
(c) stop the live streaming 1108          (a), (b), or (c) options selected?

Option (a) selected

Option (b) selected

Option (c) selected

1110

Skip presentation of a portion of the plurality of frames, such that the playing of the content item catches up to live in the particular time period

1112

Present a frame corresponding to the live streaming of the content item, such that the playing of the content item catches up to live immediately

1114

Present a corresponding frame of when determining that the playing of the content item lags behind the live streaming, such that the playing of the content item does not match the live streaming of the content item.

FIG. 11          1100

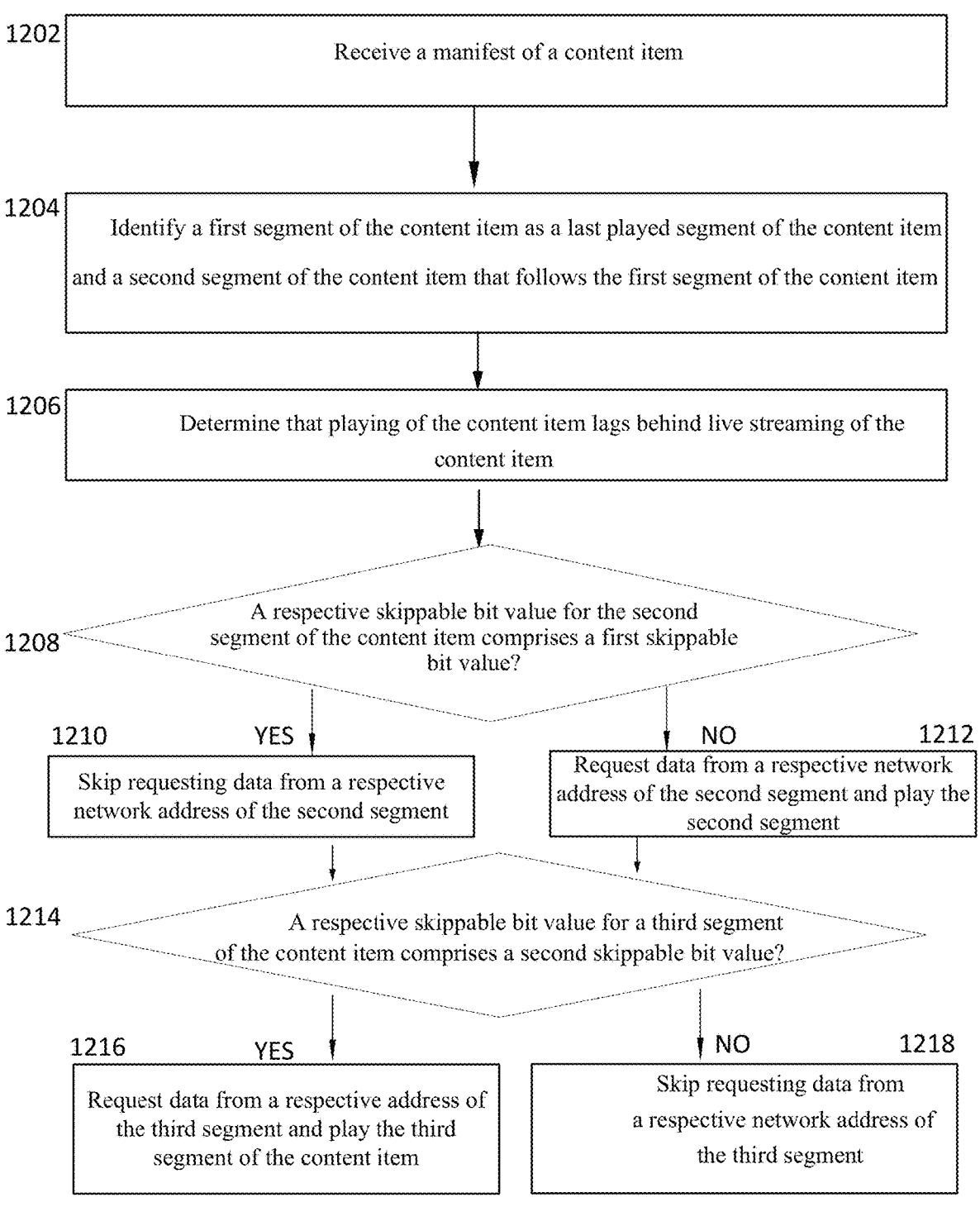
FIG. 12    1200

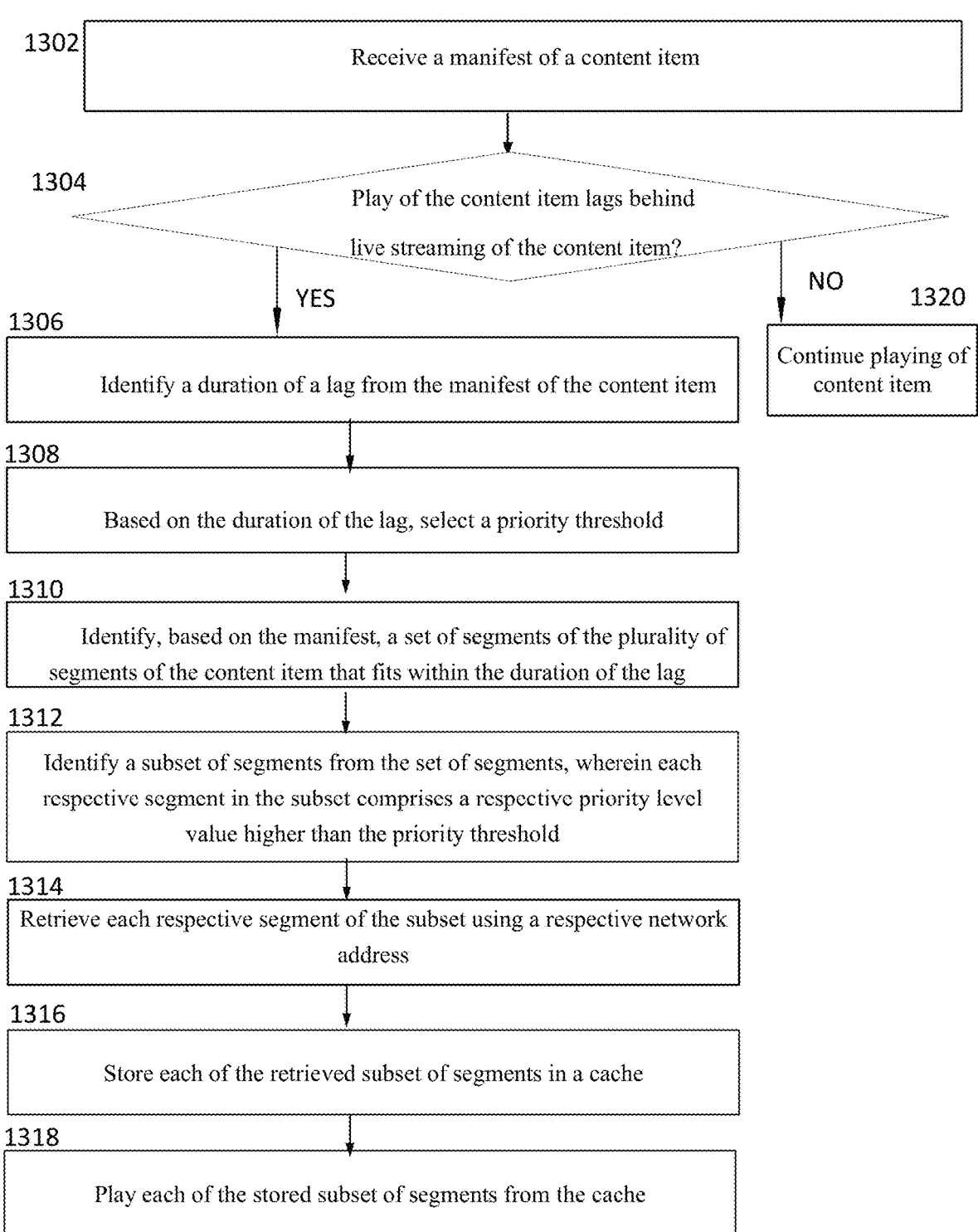
FIG. 13     <u>1300</u>

1400

1410  User Input Interface

1412  Display

1414  Speakers

1404

1406  Processing Circuitry

1408  Storage

1402  I/O Path

SYSTEMS AND METHODS FOR DYNAMICALLY SYNCING FROM TIME-SHIFTED FRAME TO LIVE STREAM OF CONTENT

CROSS-REFERENCE TO RELATED APPLICATIONS

This application is a continuation of U.S. patent application Ser. No. 18/230,876, Aug. 7, 2023, which is a continuation of U.S. patent application Ser. No. 17/114,027, filed Dec. 7, 2020, now U.S. Pat. No. 11,770,588, the disclosure of which is incorporated by reference in its entirety.

BACKGROUND

This disclosure is generally directed to dynamically synchronizing a presentation of a time-shifted frame of a content item to a live stream of the content item. In particular, methods and systems are provided for transitioning to the latest frame of the live stream of the content item by intelligently skipping a subset of time-shifted frames.

SUMMARY

With the advent of the internet and the increasing popularity of playing content items over the internet, live streaming of a content item (e.g., media asset) has become one of the most popular content delivery types. Sometimes, a presentation of the content item on a user device may lag behind the live streaming of the content item, causing a noticeable latency of the presentation between what should have been presented and what is currently presented. In one example, the lag may occur due to an unstable or slow network connection or low computer performance. In another example, the lag may occur due to a trick play (e.g., rewind or pause) requested by a user.

To address such lag in the content item's presentation, in one approach, the system will simply keep playing the content item behind the live streaming without ever catching up. This approach is deficient because the user may be exposed to a spoiler via a different content delivery method. For example, the user may receive a notification showing an up-to-date soccer game score on a mobile phone while watching a delayed soccer game on a laptop. This may prevent the user from thoroughly enjoying the soccer game because knowing the game's outcome can diminish the full experience of watching a live sports game.

In another approach, the system will allow the user to instantly catch up to live (e.g., by pressing a "live" button). This approach is also deficient because the instant catch-up will entail simply not showing a large number of frames (e.g., if the lag was 2 minutes, then 2 minutes of the content may be not shown), which will cause the user to miss important scenes that are critical to the content item and end up not having enough context to fully understand the content.

To overcome such deficiencies, methods and systems are described herein for gradually catching the presentation of the content item up to the live stream by skipping subsets of missed segments of the content item while still presenting important subsets of the content item. For example, upon determining that the playing of the content item lags behind the live streaming of the content item, a streaming application determines a skippable bit value for a missed segment of the content item. The streaming application may determine skippable bit value from a manifest of the content item, which includes segment information and skippable bit value information for each segment. The skippable bit value indicates whether a presentation of a respective segment or a frame can be skipped to catch up to live.

If a skippable bit value includes an enabled bit value, then the streaming application skips a presentation of a respective segment. If a skippable bit value includes a disabled bit value, then the streaming application does not skip a presentation of a respective segment and plays the respective segment because it is considered an important segment to understand the context of the content item. If a respective segment includes a disabled skippable bit value, then the data of the respective segment may be retrieved from a respective network address, and the respective segment may be played based on the data retrieved from the respective network address.

The present disclosure addresses the problems of both a) never catching up or b) instantly catching up. It may do so by, for example, identifying important portions of the missed segments (e.g., by disabling the skippable bit for those portions) and determining which segments to skip to eventually catch up to the live stream, thereby enabling the user to consume live video yet still presenting enough content of the missed segments needed to understand the context of the content item. The present disclosure further addresses the problems described above by, for example, saving the network bandwidth and reducing network traffic by not sending less important segments, for the purpose of catching up to live.

In one embodiment, when the playing of a content item lags behind the live streaming, a user is often provided with limited catching-up options to address the lagging problem. For example, in one approach, the streaming application may display an option for the user to skip all the missed segments to go live instantly. In another approach, the streaming application may not present any options. These approaches may be deficient because each user may have different preferences for how much time they would like to spend watching the missed segments or how much content to consume to catch up to live based on the content item. Yet, these approaches do not give each user different catching-up options that meet each user's preferences and viewing situations.

The present disclosure addresses the problems of both a) never catching up to live or b) catching up instantly, by generating for display a user-selectable option to choose a time period during which to view the missed portion of the content item or to specify a desired amount of content to be presented to the user. For example, when playing of the content item lags behind the live streaming of the content item, a streaming application may present user-selectable options. The example selectable options include an option for a user to select a particular time period, which specifies how long the user wants the missed segments to be presented before catching up to live. Selecting the particular time period (e.g., two minutes) allows the user to skip only a certain portion of the missed segments and play a user-designated amount of the missed segments, such that the playing of the content item catches up to live in the selected particular time period.

In some embodiments, when playing of the content item lags behind the live streaming, the system takes various approaches to address the lagging problem. In one approach, the system caches all the remaining segments of the content item from a server of a content item source to store the segments in a cache. This approach may be deficient, because it may take up too much memory to store all the cached segments, some of which may never even be played.

In another approach, the streaming application may request segments of the content item from the server of the content item source directly in real time for data transmission without caching any of the segments. This approach may also be deficient, because it may strain the network in real time. Requesting segments of the content item in real time may lead to a more severe lag due to the network bandwidth consumption for transmitting a large amount of data during the period of the lag.

The present disclosure addresses the problems described above by storing an appropriate number of time-shifted segments (e.g., missed segments due to a delay) in a way that does not overuse the network resources. For example, methods and systems are described herein for storing a portion of segments of a content item in the cache and playing the portion of the segments from the cache. When playing of the content item lags behind the live streaming of the content item, the streaming application identifies a duration of the lag (e.g., two minutes) from a manifest of the content. The manifest may include segment information of the content item and priority level value information for each segment (or a frame). A priority level value may establish a relative position of a respective segment or frame with other segments or frames in determining whether the respective segment or frame needs to be stored in the cache for later presentation.

From the identified duration of the lag, the streaming application determines a priority threshold (e.g., five). A priority threshold may be used to determine the number of segments to store in the cache to provide a seamless viewing experience with the content item and still to catch up to live. For example, based on the duration of the lag, the streaming application determines a set of segments of the content item that fits within the lag (e.g., three segments within the two-minute lag).

Among the three identified segments (or frames), a subset of the segments with a priority level above the priority threshold is determined (e.g., segment 2 with a priority level of seven is identified because its priority level is higher than the priority threshold of five). The streaming application stores a respective identified segment with a higher priority level than the priority threshold in the cache for later viewing. The present disclosure addresses the problems described above by, for example, caching only a portion of segments that are important enough to not miss the context of the missed segments that helps the users to understand the next segments of the content item, and also by minimizing use of network resources, bandwidth consumption, and amount of local storage dedicated to caching.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 shows an exemplary embodiment for storing the missed segment in the cache based on the received segment metadata, in accordance with some embodiments of the disclosure;

FIG. 11 shows an illustrative process for catching up to live based on a user selection, in accordance with some embodiments of the disclosure;

FIG. 12 shows an illustrative process for catching up to live based on a skippable bit value, in accordance with some embodiments of the disclosure;

FIG. 13 shows an illustrative process for caching a time-shifted segment to catch up to live, in accordance with some embodiments of the disclosure;

DETAILED DESCRIPTION

Figure 1:
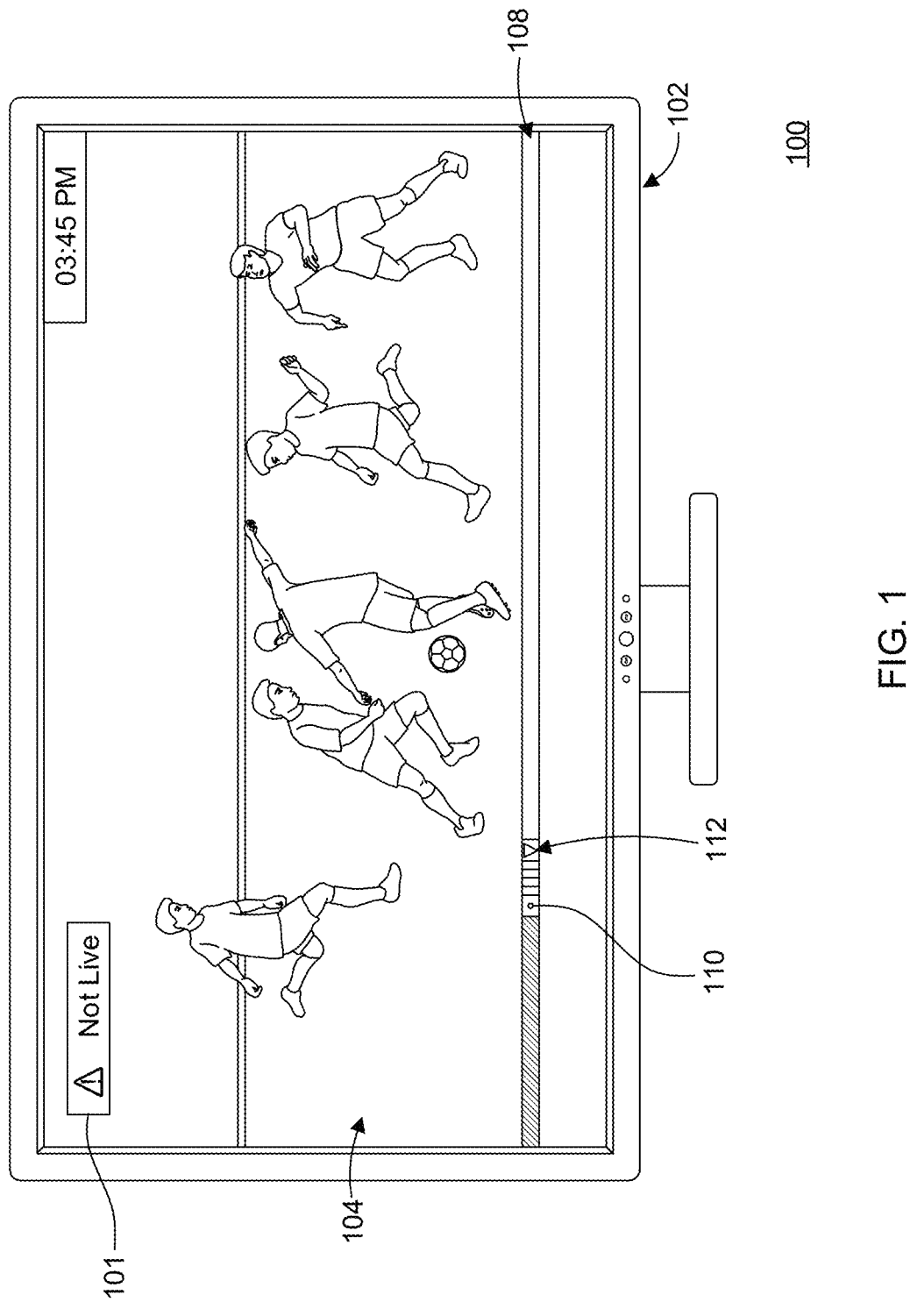
FIG. 1 depicts an exemplary user interface for providing a content item that has fallen behind live streaming of the content item, in accordance with some embodiments of the disclosure.

FIG. 1 shows an example content instantiation 100 that shows a content item that has fallen behind live streaming of the content item, in accordance with some embodiments of the disclosure. Although FIGS. 1-4 depict user device 102, 202, 302, 402 as a television, it will be understood that any suitable device for displaying a live stream may be used, such as user television or gaming equipment 1502, user computer equipment 1504, or wireless user communications device 1506 discussed below in relation to FIG. 15. The user device 102, 202, 302, 402 may have control circuitry 1404 of FIG. 14 configured to request the live stream of the content item from a server for display (e.g., on a display such as display 1412 discussed later in more detail with reference to FIG. 14). FIGS. 1-4 depict improved user interface that includes exemplary content instantiation, which illustrate catching-up operations.

As shown in FIG. 1, user device 102 requests an audio-visual media asset that includes a group of segments. It will be understood that, consistent with the present disclosure, any content item may be requested for streaming from the media server. As referred to herein, the term "content item" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

As shown in FIG. 1, a segment 104 of a content item (e.g., soccer game) is streamed on user device 102 via the streaming application. The streaming application may be a stand-alone application implemented on user equipment device 1400. The streaming application may generate a live status indicator 101 for display, which indicates whether a segment that is currently presented on user device 102 is a real time stream (i.e., live segment). In exemplary user interface 100, live status indicator 101 indicates that segment 104 is not a live stream (by showing "Not Live"). In another example, live status indicator 101 may be a word "live" that appears grayed out or otherwise altered.

The streaming application may generate for display a progress bar 108, which depicts the progress of the viewing history of the content item. Progress bar 108 may include a current position bar 110, which indicates a current segment location in the duration of the content item and a live position bar 112 which indicates a live segment location in the duration of the content item. As indicated in FIG. 1, segment 104 currently lags behind the live stream of the content item as the current position bar 110 and the live position bar 112 are not aligned together (current position bar 110 is located on the left side of live position bar 112).

Figure 2:
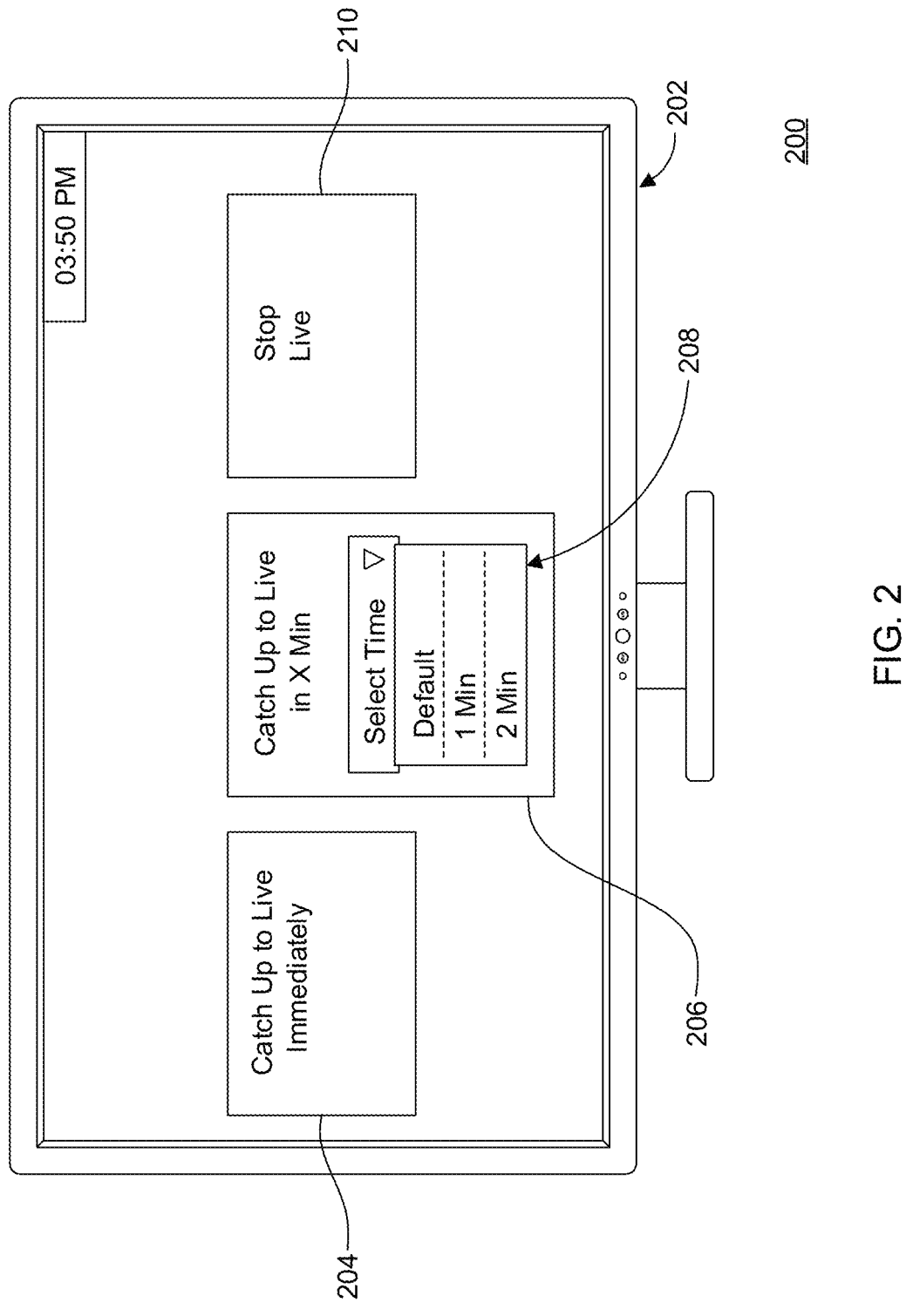
FIG. 2 depicts an exemplary user interface for providing user-selectable catching-up options, in accordance with some embodiments of the disclosure.

FIG. 2 depicts an exemplary user interface 200 for providing user-selectable catching-up options on a user device 202, in accordance with some embodiments of the disclosure. Upon detecting a lag, the streaming application may display the user selectable options 204, 206, 210, which can be selected via user input. In some embodiments, the streaming application displays user selectable options 204, 206, 210 only when the lag is enough (e.g., when it exceeds a certain threshold, for example, when it's longer than 1 minute or longer than 5 minutes).

Selecting of each user-selectable option triggers the streaming application to perform different catching-up actions. User selection may be made by any suitable type of user interface input method, such as clicking, tapping, or voice input as described in 1410 of FIG. 14. In some embodiments, upon selecting a "Catch up to live immediately" option 204, the streaming application skips all of the missed segments of the content item and catches up to live instantly. As a result, the user will view the most up-to-date segment of the content item in real time. Upon selecting a "Stop live" option 210, the streaming application may keep playing the content item without ever catching up to live. As a result, the user will permanently remain behind the live streaming unless a further action is taken.

Upon selecting a "Catch up to live in X min" option 206, the streaming application may display a drop-down menu that offers a list of sub-options. In one embodiment, the drop-down menu may be pre-populated with a list of values.

In another embodiment, the drop-down menu can be optional (e.g., it may not be displayed unless requested by the user). The sub-options may include a list of numbers (e.g., time periods) that the user can choose from. In some embodiments, the user can enter any value that is not displayed in the list. The particular time period may be a time basis for catching up on the missed segments. For example, if the user selects "1 min," then the streaming application will catch up the presentation of the content item to the live stream within 1 minute, regardless of the duration of the lag.

In some embodiments, the drop-down menu includes a system-configured default value. The streaming application determines the default value based on the user's past history or patterns for catching up to live. For example, the default value may be determined based on a user profile or a type of a content item (e.g., action v. romance). The default value may be determined based on a time of day that content item is played. The default value may be determined based on network connectivity and hardware condition. These are exemplary factors that may be used to determine the default value, but any suitable factors may be used to determine the default value. When the user selects the default value, then the streaming application catches up to live in the time period corresponding to the default value.

Figure 3:
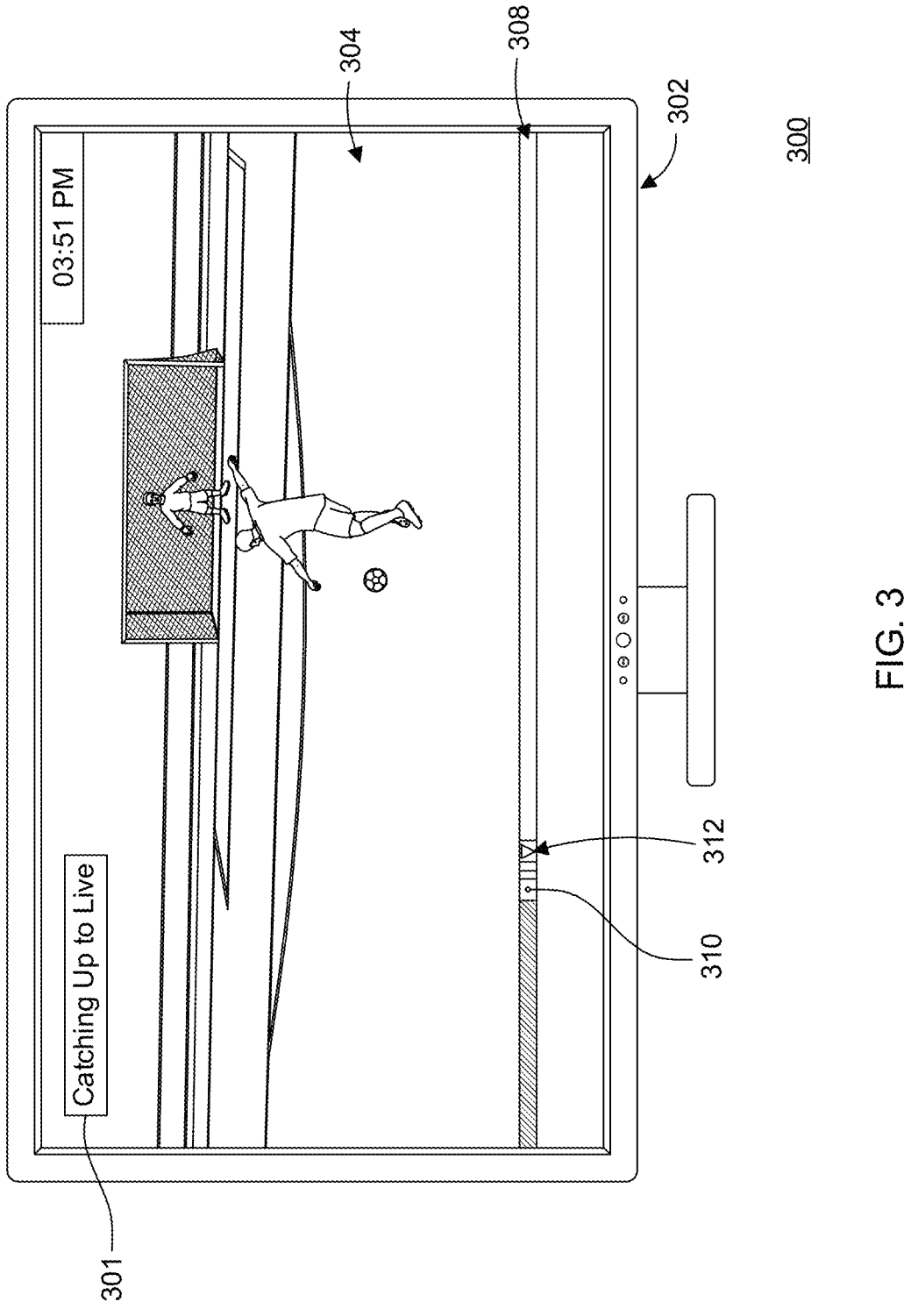
FIG. 3 depicts an exemplary user interface for catching up to live stream of the content item, in accordance with some embodiments of the disclosure.

FIG. 3 depicts an exemplary user interface 300 for catching up to the live stream of the content item on a user device 302, in accordance with some embodiments of the disclosure. Upon receiving user input specifying a value for the particular time period of option 206, the content item will be caught up to live in the particular time period (e.g., 2 minutes). While catching up, the streaming application displays a live status bar 301 which indicates "Catching up to live" is in progress. The "Catching up to live" progress can also be shown by a progress bar 308. As shown in progress bar 308, a current position bar 310 is closer to a live position bar 312 in progress bar 308 compared to current position bar 110 in content instantiation 100.

Figure 4:
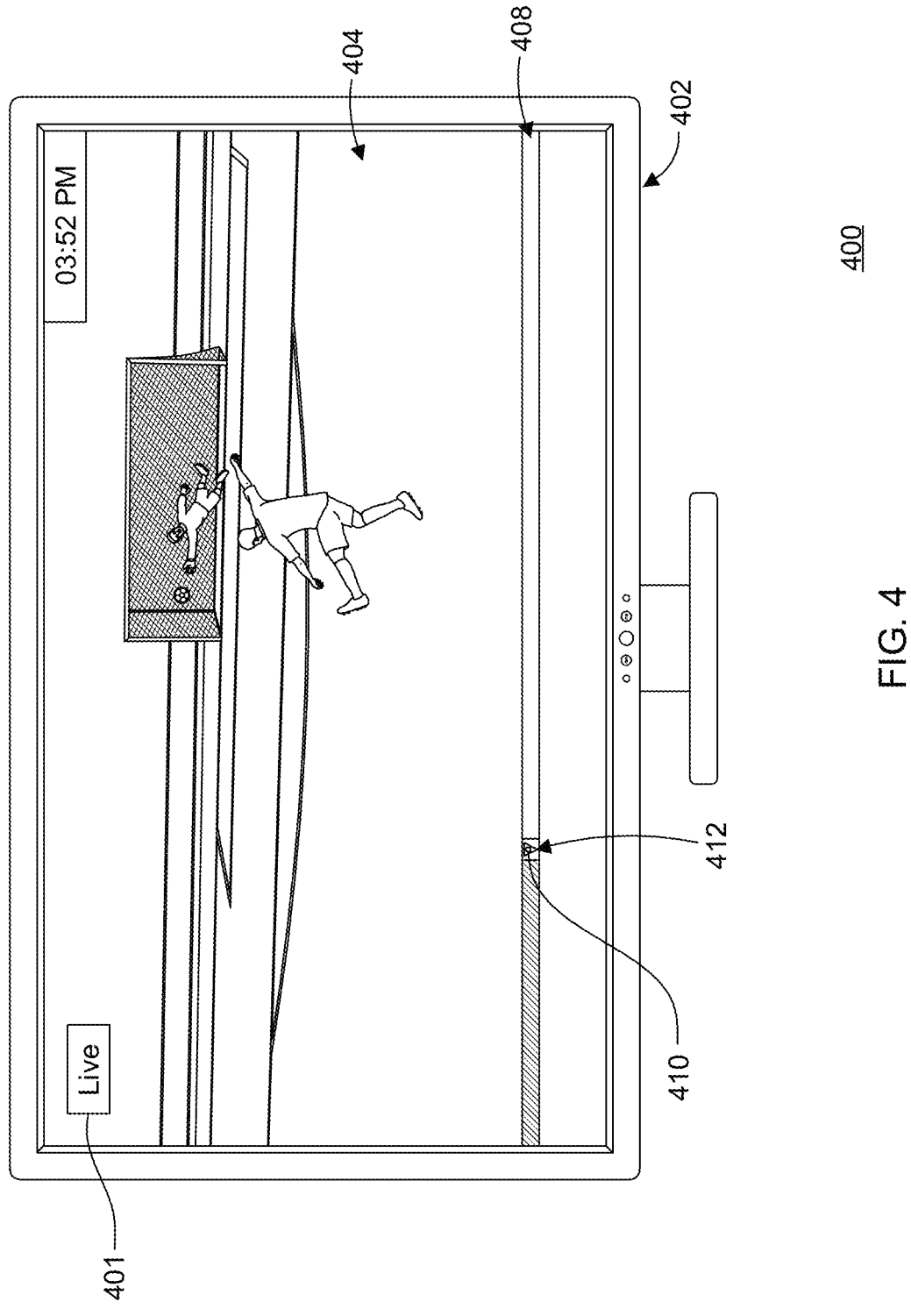
FIG. 4 depicts an exemplary user interface for presenting a live stream of the content item, in accordance with some embodiments of the disclosure.

FIG. 4 depicts an exemplary user interface 400 for presenting a live frame 404 of the content item on a user device 402, in accordance with some embodiments of the disclosure. Content instantiation 400 may be a resulting view of the user selecting "Catch up in 2 min" option 208 at 3:50 pm in FIG. 2. As a result, content item is catching up to live at 3:51 pm in FIG. 3 (showing a frame 304 where a soccer player is shooting a goal) and is finally caught up to live at 3:52 pm in FIG. 4 (showing live frame 404 where the soccer player is scoring a goal). When the content item is caught up to live, the streaming application changes live status bar 401 from "Catching Up to Live" to "Live." In some embodiments, the live status bar 401 includes a count-up or count-down countdown timer. The countdown timer indicates how much time is left or passed to catch up to live (e.g., by showing "in 3, 2, 1 seconds, live!) The completion of catching up is also shown by a progress bar 408. As shown in progress bar 408 of FIG. 4, a current position bar 410 and a live position bar 412 are aligned, indicating that content item is caught up to live. Catching-up operations will be explained in connection with FIGS. 5-8.

Figure 5:
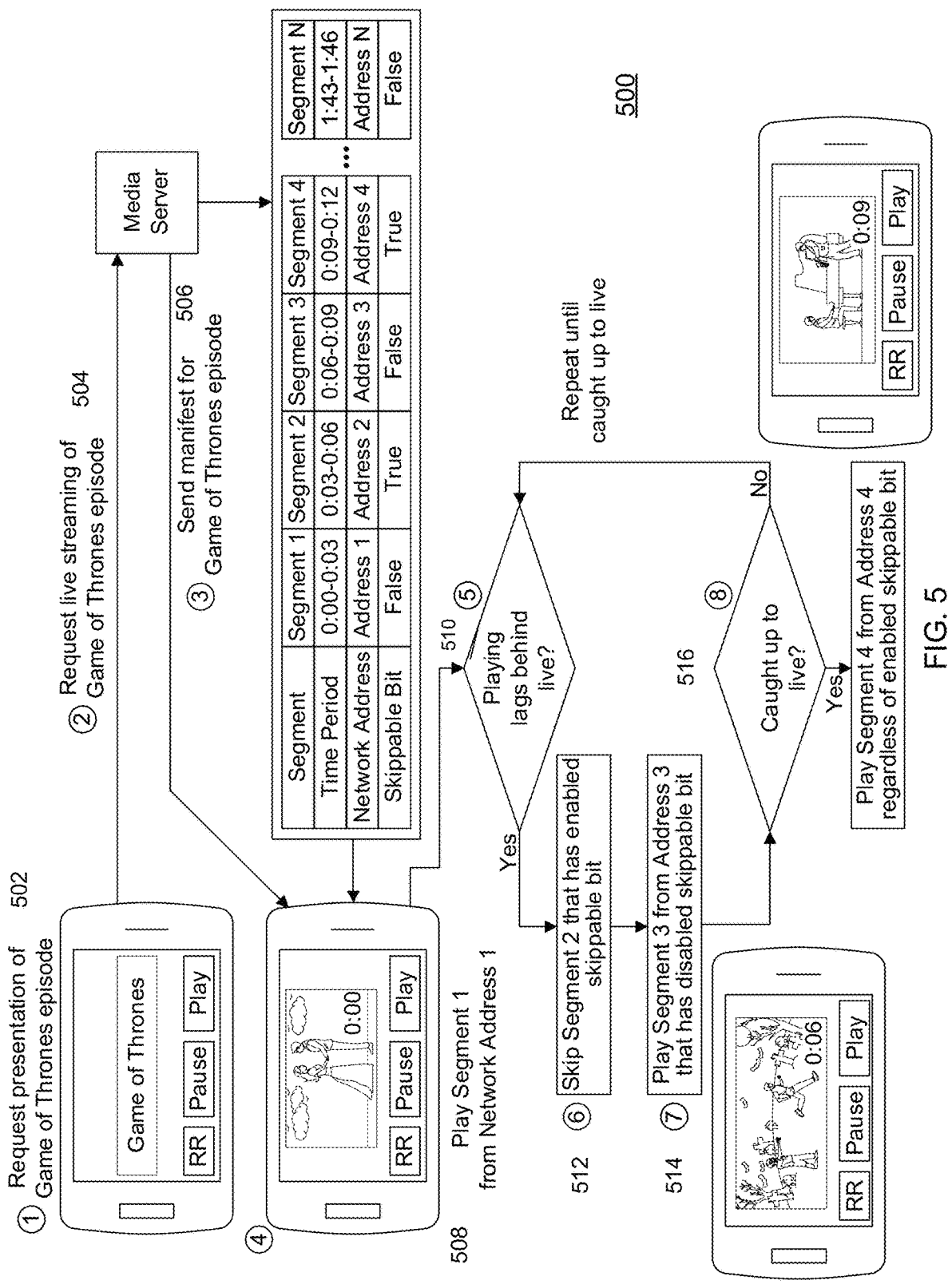
FIG. 5 shows an exemplary embodiment for determining, by a client device, whether to skip a presentation of a missed segment based on a manifest of the content item, in accordance with some embodiments of the disclosure.

FIG. 5 shows an exemplary embodiment 500 for determining, by a client device, whether to skip a presentation of a missed segment based on a manifest of the content item, in accordance with some embodiments of the disclosure. The client device can be any user television or gaming equipment 1502, user computer equipment 1504, or wireless user communications device 1506 discussed below in relation to FIG. 15. It should be noted that embodiments

Figure 14:
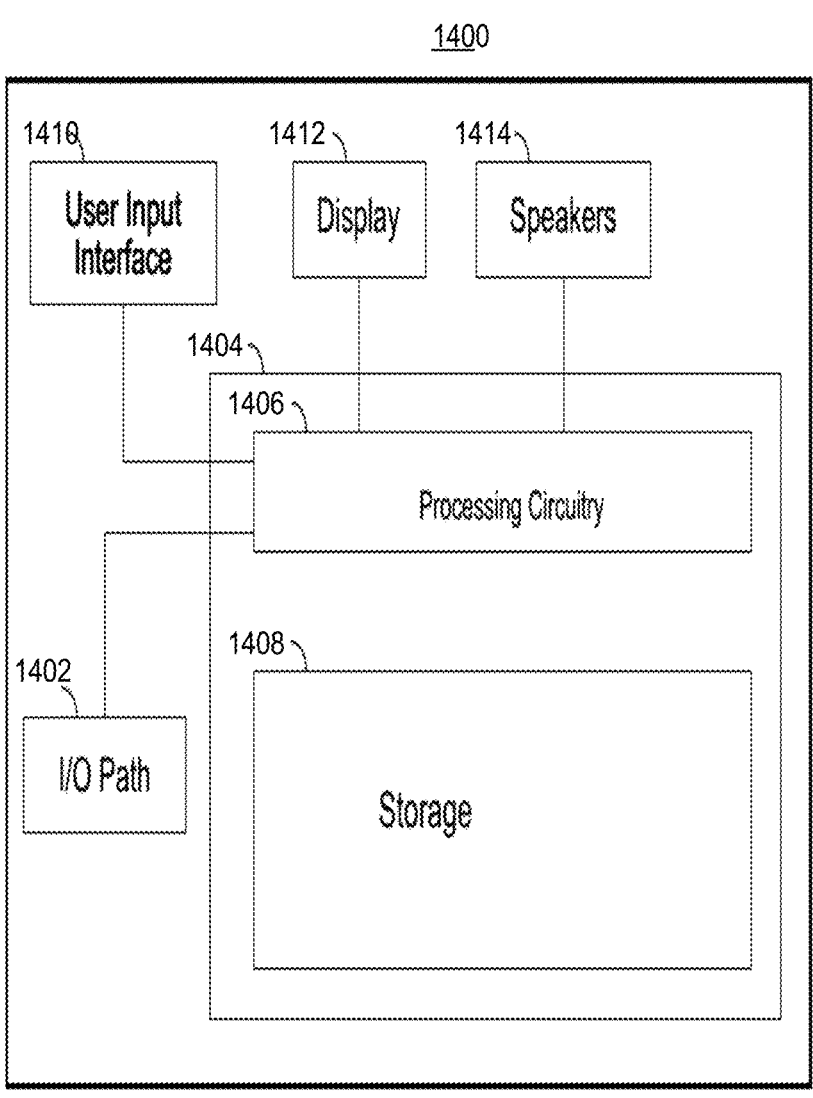
FIG. 14 shows a block diagram of an illustrative user device, in accordance with some embodiments of the disclosure.

500-1000 may be performed by control circuitry 1404 of FIG. 14 as instructed by the streaming application, which may be performed on any client device. In addition, one or more steps of embodiments 500-1000 may be incorporated into or combined with one or more steps of any other processes or embodiments described in the present disclosure.

At step 502, the user may request a presentation of a content item (e.g., an episode of "Game of Thrones") via the streaming application on the client device. The content item consists of one or more segments. Each segment consists of one or more frames, where the length of each segment ranges approximately from zero to a few seconds (e.g., 0-6 seconds). A frame is one of the many still images that compose the content item. For example, the manifest may be an MPEG-DASH manifest.

At step 504, the streaming application requests a live streaming of a content item to a media server. The media server may reside in a content item data source 1518 of FIG. 15. At step 506, in response to the request, the media server sends a manifest of the content item. The manifest contains information about sequential segments of the content item, for example, timing of each segment, location on the network such as a network address from where each segment can be retrieved, or a skippable bit value for each segment. As shown in the manifest, a time period for segment 1 is from 0:00 to 0:03, a network address for retrieving segment 1 is address 1, and a skippable bit value for segment 1 is "False." These are just example manifest parameters, and any suitable parameters or variations may be used for each component of the manifest.

The skippable bit value indicates whether a presentation of a respective segment may be skipped to catch up to live. For the delayed content item to catch up to live stream, some segments of the content item needs to be skipped due to the time gap. The skippable bit value indicates which of the missed segments may be skipped to catch up the time gap. If a skippable bit value includes an enabled bit value, then the streaming application skips a presentation of a respective segment (only when the content item lags behind the live). If a skippable bit value includes a disabled bit value, then the streaming application does not skip a presentation of a respective segment, because it is considered as an important segment to understand the context of the content item. The data of the respective segment may be retrieved from a respective network address, and the respective segment may be played based on the data retrieved from the respective network address.

In some embodiments, the media server may determine a skippable bit value based on an importance level of a segment. The media server determines an importance level of the segment based on various factors, including a number of scheduled replays of the segment in a predetermined time period (e.g., sports highlights which are scheduled to be played three times this week), a type of content item (e.g., movie v. live sports game), or a genre of the segment (e.g., action v. romance).

In some embodiments, a machine learning algorithm is used to identify skippable segments. For example, a training set including segments that were commonly skipped by a large number of users may be compiled. The machine learning algorithm may then take a new segment as an input and compare it to known skipped segments. When the similarity is high, the machine learning algorithm may identify the new segment as a skippable segment and a skippable bit value may be enabled. The machine learning algorithm may train a set of data based on the user's preferences or past history. This is an example method of determining a skippable bit value, and any suitable methods may be used to determine the skippable bit value for the segment.

The skippable bit information for each segment may be inserted into the manifest or metadata of the segment by the media server either enabling or disabling the skippable bit value. The manifest or the metadata of the segment may be stored in a database of the media server.

In one embodiment, the skippable bit includes one of the two values, such as an enabled bit value (e.g., 1) or disabled bit value (e.g., 0). An enabled skippable bit indicates that a presentation of a respective segment may be skipped. A disabled skippable bit indicates that a presentation of a respective segment may not be skipped. In another embodiment, the skippable bit value includes a range of numbers. If a respective segment has a skippable bit value that is higher than an importance threshold, then the respective segment is determined to have a disabled bit value. On the other hand, if a respective segment has a skippable bit value that is lower than the importance threshold, then the respective segment is determined to have an enabled bit value.

In some embodiments, the importance threshold may be determined by the media server or the client device. The importance threshold may be determined based on the user profile or the content item in a similar technique and manner described above. For example, if the content item is an action movie, which the user indicated to be the favorite genre, then the importance threshold for the content item is determined to be higher than a romance movie about which the user cares less.

At step 508, upon receiving the manifest, which includes network address information for segment 1, the streaming application retrieves segment 1 of the content item from network address 1 and plays the retrieved segment 1 on the client device. At step 510, the streaming application determines whether playing of the content item lags behind the live streaming. One method of detecting the lag is described with respect to FIG. 11. In addition, one or more steps of process 1100 described in FIG. 11 or embodiments 100-400 of FIGS. 1-4 may be incorporated into or combined with step 510. For example, upon the user selecting "catch up to live in X min" option 206 in FIG. 2, the streaming application performs the steps described in FIGS. 5-10.

At step 512, upon detecting the lag between the currently displayed segment and the live segment, the streaming application evaluates the next segment that follows segment 1 (segment 2) and reads a skippable bit value from the manifest. As shown in the transmitted manifest at step 506, segment 2 has an enabled skippable bit, indicating that a presentation of segment 2 can be skipped. Therefore, the streaming application skips retrieving of segment 2 from address 2 because the presentation of segment 2 is not necessary during the catching up to live operation.

After completing step 512, the streaming application reads a skippable bit value for a segment that follows segment 2: segment 3, at step 514. As indicated in the manifest, the skippable bit value for segment 3 is "false," a disabled bit value, indicating that a presentation of segment 3 cannot be skipped. Therefore, the streaming application retrieves data for the segment 3 from network address 3 and plays segment 3 from the network address 3.

At step 516, the streaming application determines whether the content item is caught up to live. If the streaming application determines that the content item is caught up to live, then the streaming application plays segment 4 regardless of the skippable bit value. Since there is no latency anymore, the streaming application does not skip any segment of the content item. If the streaming application determines that the content item is not caught up to live, then the streaming application repeats the steps in FIG. 5 until the content item is caught up to live.

Figure 6:
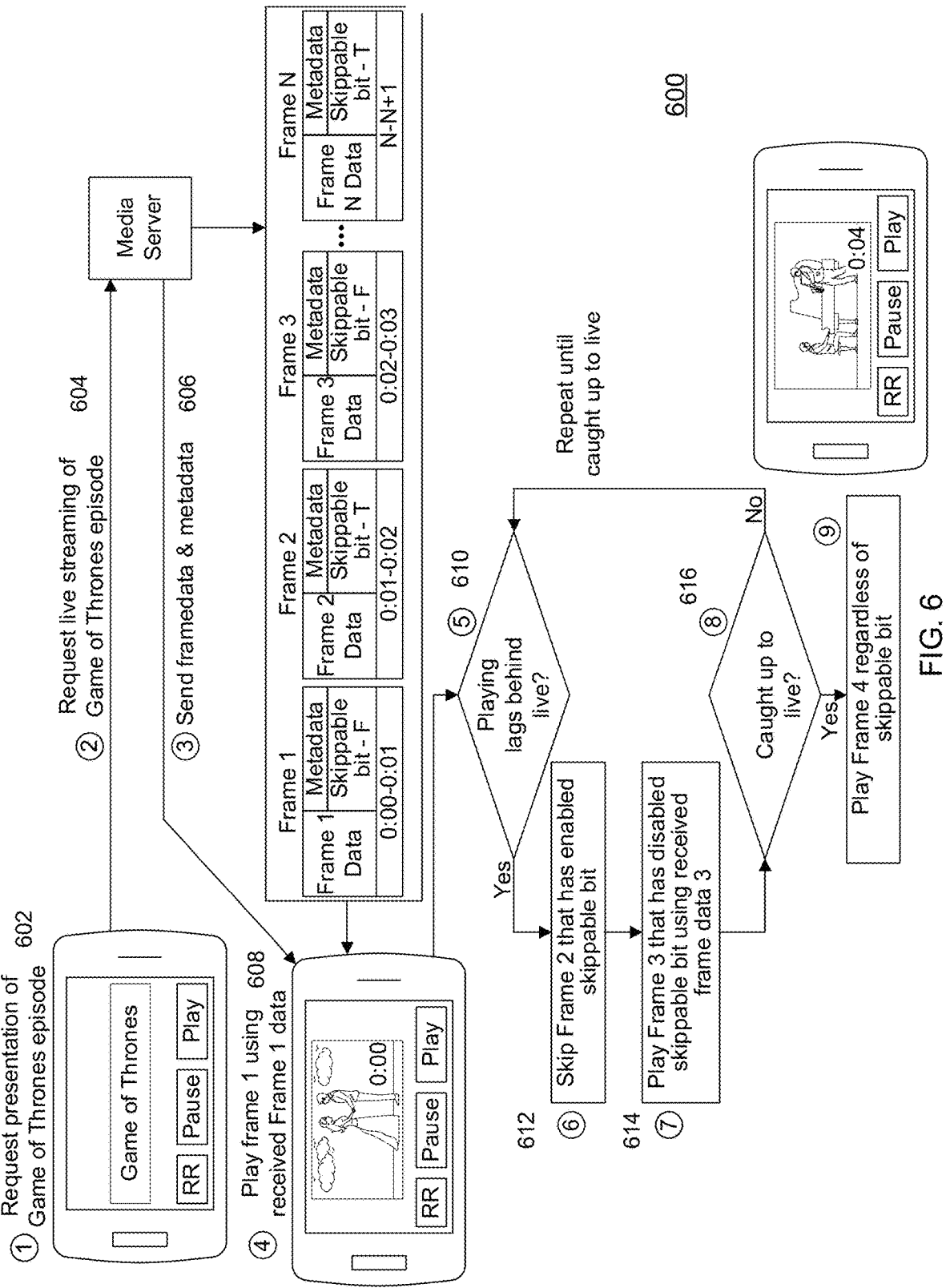
FIG. 6 shows an exemplary embodiment for determining, by the client device, whether to skip a presentation of the missed segment based on metadata of the missed segment that is received upon requesting the content item, in accordance with some embodiments of the disclosure.

FIG. 6 shows an exemplary embodiment 600 for determining, by the client device, whether to skip a presentation of the missed frame based on metadata of missed frame that is received upon requesting the content item, in accordance with some embodiments of the disclosure. The content item consists of one or more segments. Each segment consists of one or more frames, where the length of a frame ranges approximately from zero to 16.33 milliseconds. A frame is one of the many still images that compose the content item.

Embodiment 600 is different from embodiment 500 in that the streaming application does not receive the manifest of the content item. Instead, the streaming application receives frame data and metadata upon requesting the live streaming of the content item. The frame data may include content data for the frame, such as digital pixel values. The metadata contains information about the skippable bit for each metadata, which indicates whether a presentation of a respective metadata may be skipped and a sequential location data of a frame in the content item.

At step 602, the user may request a presentation of the content item. At step 604, the streaming application requests live streaming of the content item to the media server. At step 606, unlike step 506 of embodiment 500, the media server sends frame data and metadata of the content item. The frame data and metadata may be a complete packet with all the content data necessary to play the content item from the beginning to the end. The frame data and the metadata may be stored in a database of the media server, which may reside in content item data source 1518.

At step 608, the streaming application plays frame 1 using the received frame 1 data. At step 610, the streaming application determines whether a lag is detected. In some embodiments, upon detecting the lag, the streaming application may generate the user-selectable "catching-up" options for display, as described in FIG. 2.

At step 612, based on the metadata, the streaming application determines that a presentation of frame 2 may be skipped because frame 2 has an enabled skippable bit (e.g., or when the user selects "catch up to live in X min" option 206 of FIG. 2). Thus, the streaming application skips the presentation of frame 2. At step 614, the streaming application identifies a next frame of the content item that follows frame 2 and performs similar steps. For frame 3, the streaming application determines that a presentation of frame 3 cannot be skipped because frame 3 has a disabled skippable bit value. Thus, the streaming application plays frame 3 using the received frame 3 data.

At step 616, the streaming application determines whether the content item is caught up to live. If the content item is caught up to live, then the streaming application plays frame 4 regardless of a skippable bit value for frame 4. If the content item is not caught up to live, then the streaming application repeats similar steps until the content item is live.

Figure 7:
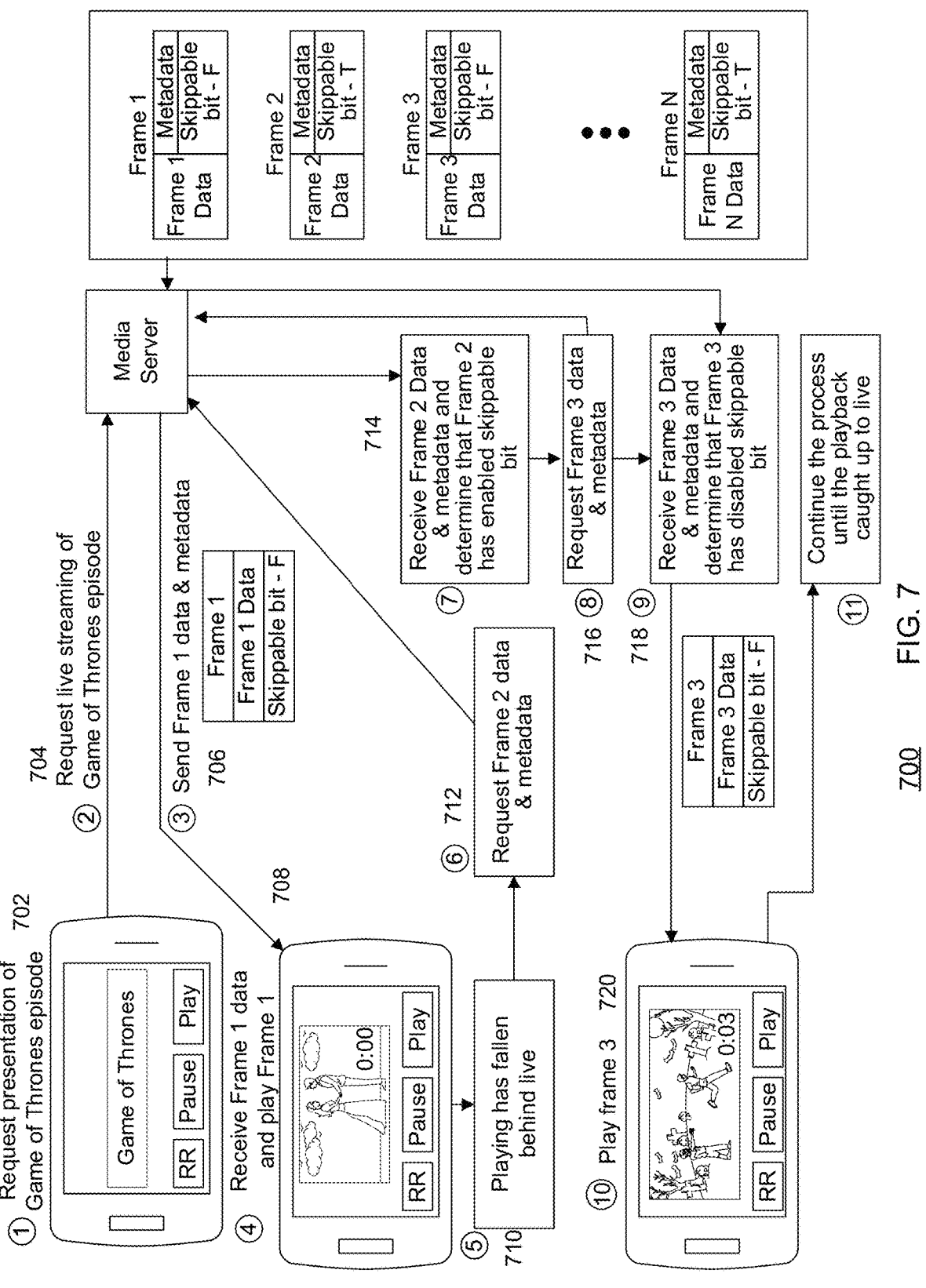
FIG. 7 shows an exemplary embodiment for determining, by the client device, whether to skip a presentation of the missed segment based on metadata of each missed segment that is received upon requesting a respective missed segment, in accordance with some embodiments of the disclosure.

FIG. 7 shows an exemplary embodiment 700 for determining, by the client device, whether to skip a presentation of the missed segments based on metadata that is received upon requesting a respective missed segment, in accordance with some embodiments of the disclosure. Embodiment 700 is different from embodiment 600 in that the streaming application does not receive the complete packet including all of the frame data and the metadata at once but receives individual frame data and metadata each time when the streaming application requests a respective frame from the media server.

At step 702, the user may request a presentation of the content item. At step 704, the streaming application requests live streaming of the content item from the media server. At step 706, unlike embodiment 600, the streaming application sends only frame 1 data and metadata, instead of sending all the frame data and metadata of the content item. Among much other content information, the metadata contains information about a skippable bit value for each frame. At step 708, the streaming application obtains frame 1 data from the media server and plays frame 1 using the received frame 1 data.

At step 710, the streaming application determines whether a lag exists between the live frame and the currently displayed frame on the client device. In one embodiment, step 710 may be optional, and the streaming application may perform step 712 without performing step 710.

At step 712, the streaming application requests frame 2 data and metadata from the media server. In one embodiment, the streaming application may only request frame 2 data without requesting metadata of frame 2 if a lag is not detected at step 710. Upon receiving the request for frame 2 from the streaming application, the media server sends frame 2 data and metadata to the streaming application.

At step 714, the streaming application receives frame 2 data and metadata from the media server. Based on the metadata, the streaming application determines that frame 2 has an enabled skippable bit ("true" skippable bit). The streaming application may skip a presentation of segment 2 based on the enabled skippable bit value. In one embodiment, the streaming application performs step 710 after receiving frame 2 data from the media server. Step 710 may be performed each time frame data is received at the streaming application to determine whether a respective received frame may be skipped to catch up to live.

At step 716, the streaming application identifies the next frame (frame 3) and requests frame 3 data and metadata from the media server. At step 718, the streaming application receives requested data from the media server and reads the skippable bit value for frame 3. As illustrated in the exemplary frame data connected to the media server, frame 3 has a disabled skippable bit ("false" skippable bit), and based on this, the streaming application determines that a presentation of frame 3 cannot be skipped. At step 720, the streaming application plays frame 3 using the received frame data. The steps in FIG. 7 may be repeated until the content item is caught up to live.

Figure 8:
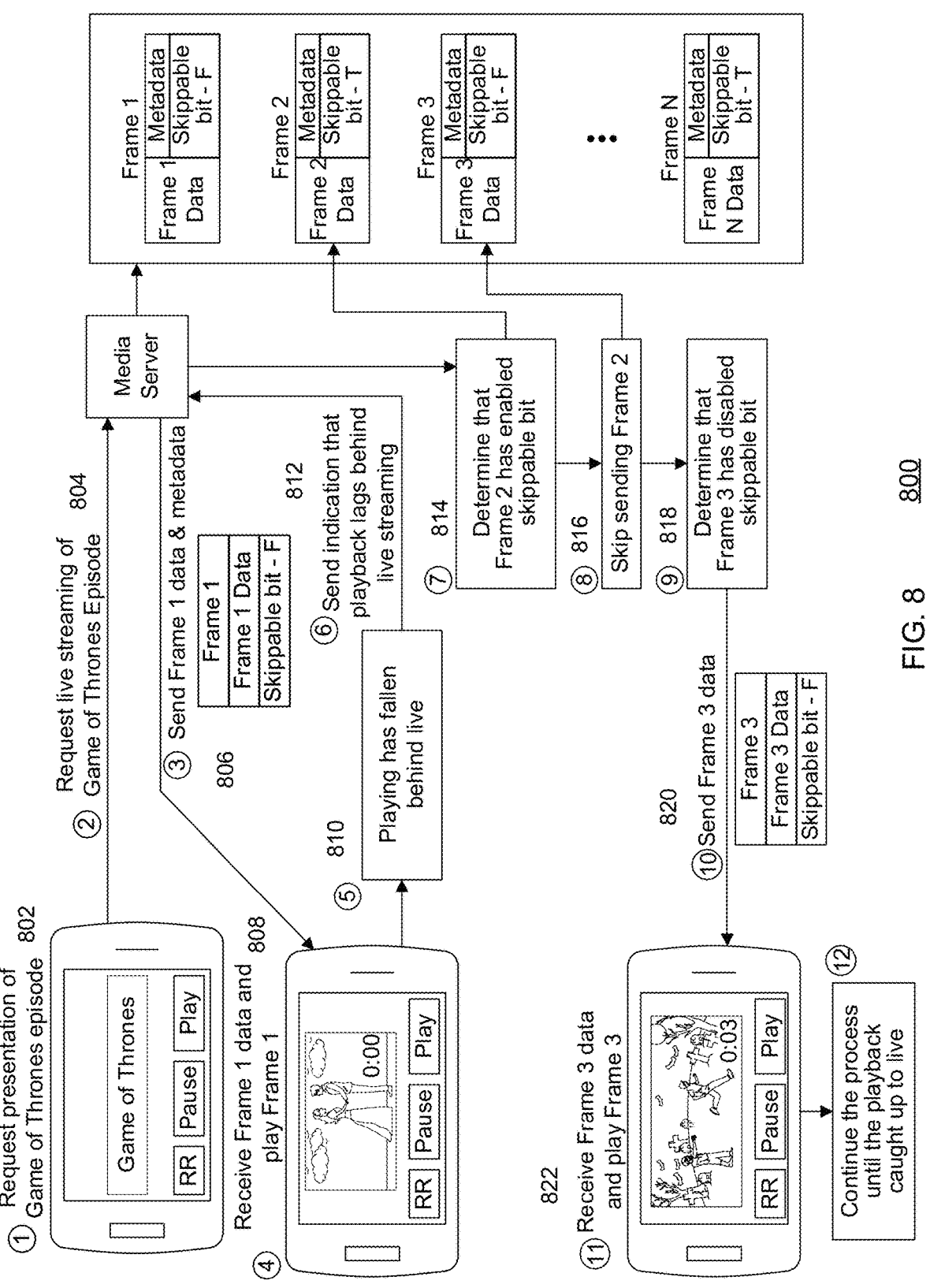
FIG. 8 shows an exemplary embodiment for determining, by a server, whether to skip a presentation of the missed segment based on metadata of the missed segment, in accordance with some embodiments of the disclosure.
Figure 15:
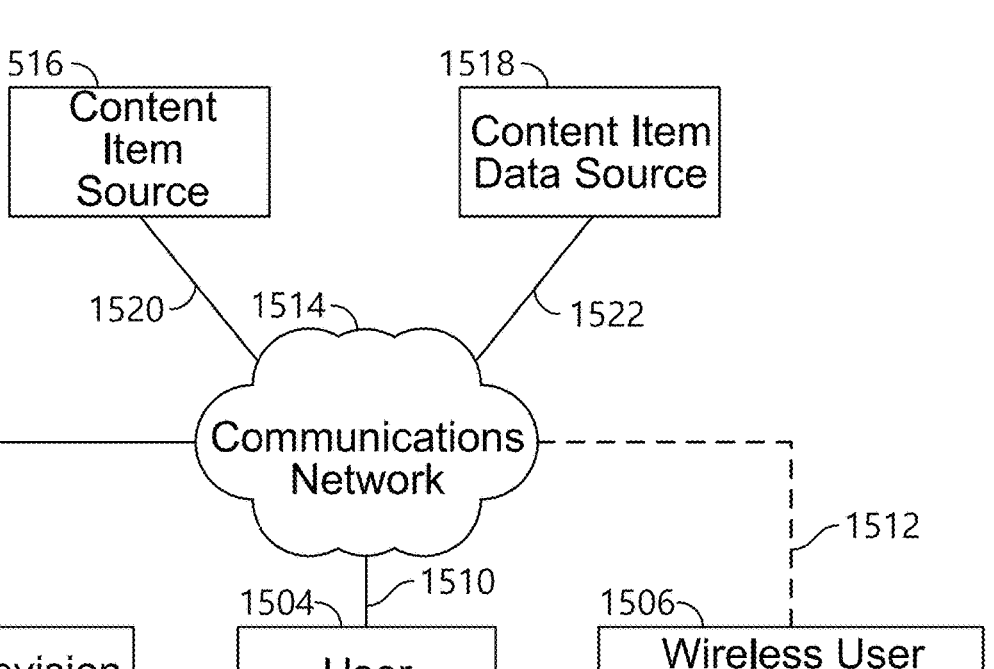
FIG. 15 shows a block diagram of an illustrative media system, in accordance with some embodiments of the disclosure.

FIG. 8 shows an exemplary embodiment 800 for determining, by a server, whether to skip a presentation of the missed segment based on metadata, in accordance with some embodiments of the disclosure. Embodiment 800 is different from embodiment 700 in that embodiment 800 is performed by the media server that resides in the content item data source 1518 of FIG. 15, compared to embodiment 700, which was performed by the client device. In embodiment 800, the media server determines which of the missed frames to be sent to the streaming application.

At step 802, the user may request a presentation of the content item. At step 804, the streaming application requests live streaming of the content item to the media server. At step 806, the media server sends frame 1 data and metadata. The respective metadata contains skippable bit information for corresponding frames. At step 808, the streaming application receives frame 1 data and metadata from the media server and streams frame 1 with the received frame 1 data.

At step 810, the streaming application detects a lag between the currently displayed frame and the live frame.

At step 812, the streaming application sends an indication to the media server that there is a lag between the currently displayed frame and the live frame. At step 814, the media server queries the database of the media server and determines that frame 2 has an enabled skippable bit ("true" skippable bit value). At step 816, the media server determines that segment 2 can be skipped for presentation and skips sending frame 2 data to the streaming application.

At step 818, the media server identifies a subsequent frame to frame 2 and determines that frame 3 has a disabled skippable bit ("false" skippable bit). Upon determining that frame 3 has the disabled skippable bit, the media server sends frame 3 data and metadata to the streaming application at step 820. In some embodiments, the media server only sends frame 3 data without the metadata for frame 3. Sending the metadata may be optional.

At step 822, the streaming application receives frame 3 data and plays frame 3 using the received frame 3 data. The process of FIG. 8 may continue until the content item is caught up to live.

Figure 9:
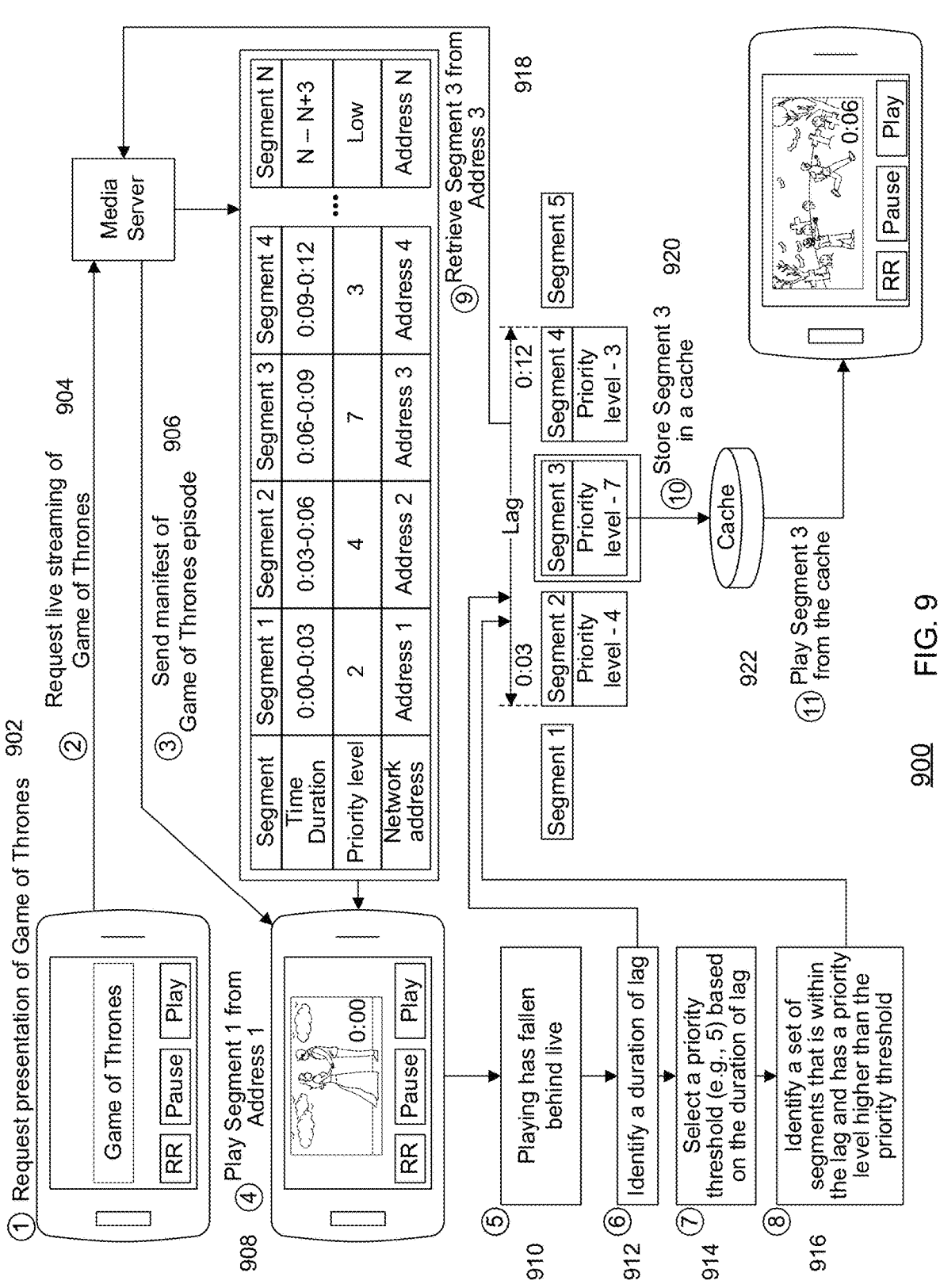
FIG. 9 shows an exemplary embodiment for storing the missed segment in the cache based on the manifest, in accordance with some embodiments of the disclosure.

FIG. 9 shows an exemplary embodiment 900 for storing missed segments in the cache based on the manifest, in accordance with some embodiments of the disclosure. At step 902, the user may request a presentation of the content item. At step 904, the streaming application requests live streaming of the content item to the media server. At step 906, the media server sends the manifest of the content item. The manifest contains information about the content item, such as a time duration of each segment, a priority level value for each segment, or a network address for each segment. The time duration of each segment may be associated with a respective timestamp of the segment, indicating the timing of the segment in the duration of the content item.

A priority level value may establish a relative position of a respective segment with other segments in determining whether the respective segment needs to be stored in the cache for a smooth presentation of the content item. The media server assigns a priority level to each segment based on the following factors. In one example, the media server assigns a priority level to each segment of the content item based on a respective relevance level of the segment. For example, the media server determines a respective relevance level of a segment to the user based on the user profile data, such that a segment of a higher relevance (e.g., matching user's preference) is determined to be more relevant to the user than other scenes. If a particular segment is of high importance to the user (e.g., action scene), then the media server assigns a higher priority level value to the particular segment than a segment that is determined to be of lower relevance to the user (e.g., romance scene). In some embodiments, the media server assigns a priority level to each frame based on the similar factors.

In another embodiment, the media server assigns a priority level to each segment of the content item based on a respective importance level of the segment in the context of the content item. For example, the media server determines a respective importance level of a segment, such that the segment includes scenes that are more important to the content itself than other scenes of the content (e.g., climax scene v. ending credits). The media server assigns a higher priority level value to a particular segment that has a higher importance level (e.g., climax) than a segment that has a lower importance level (e.g., ending credits).

In one embodiment, the media server assigns a priority level to each segment of the content items based on a number of replays of the segment in a predetermined time period. For example, the media server calculates the number of times the segment is streamed or scheduled to be streamed in a particular time period. As an example, replays of a previously streamed segment affect the priority level of a respective segment adversely because the user is likely to have been exposed to the particular segment already, and the particular segment may not need to be presented to the user again.

In some embodiments, a machine learning algorithm is used to identify a priority level for a segment. For example, a training set including segments with predetermined priority levels may be compiled. The machine learning algorithm may then take a new segment as an input and compare it to known segments. When the similarity is high, the machine learning algorithm may assign to a new segment a priority level similar to that of the known segments. The machine learning algorithm may train a set of data based on the user's preferences or past history. This is an exemplary way of determining a priority level, and any suitable methods may be used to determine the priority level for the segment.

In some embodiments, the client device assigns a priority level to each segment or a frame of the content item using the similar techniques described above. The client device stores the priority level for each segment or frame in a database or storage of the client device. With this approach, the client device may determine which segment or a frame needs to be cached and make a request to the media server data for a corresponding segment or a frame.

At step 908, based on the manifest, the streaming application plays segment 1 from network address 1. At step 910, the streaming application detects a lag between the currently played segment and the live segment. In some embodiments, one or more steps of process 1100 described in FIG. 11 or embodiments 100-400 of FIGS. 1-4 may be incorporated into or combined with step 910. For example, upon detecting the lag, the streaming application may generate the user-selectable "catching-up" options for display, as described in FIG. 2.

At step 912, the streaming application identifies the duration of the lag. For example, the streaming application determines the duration of the lag based on the timestamp associated with each segment in the manifest. In embodiment 900, the duration of the lag is determined to be from 0:03 to 0:12, as shown in FIG. 9.

At step 914, the streaming application selects a priority threshold based on the duration of the lag. In some embodiments, the priority threshold may be proportional to the duration of the lag. In some embodiments, the priority threshold may be dynamically adjusted based on the user profile data and content item, based on the techniques similar to determining the importance threshold.

TABLE 1

| Exemplary lag duration and priority threshold relationship | |
| --- | --- |
| Lag Duration | Priority Threshold |
| <2 Mins | 2 |
| 2-4 mins | 3 |
| 5-6 | 4 |
| >7 | 5 |

At step 916, the streaming application identifies a set of segments that is within the duration of the lag. In example embodiment 900, the streaming application identifies, in this example, three segments that match the length of the lag, segment 2 (0:03-0:06), segment 3 (0:06-0:09), segment 4 (0:09-0:012). Among the three identified segments, the streaming application identifies a segment that has a priority level that is higher than a priority threshold. The streaming application determines that segment 3 has a priority level of seven, which is higher than the threshold of five.

At step 918, the streaming application retrieves segment 3 from network address 3 based on the manifest. The streaming application may not retrieve segment 2 data and segment 4 data as a presentation of segments 2 and 4 may be skipped based on the priority threshold. At step 920, the streaming application stores the retrieved segment 3 in a cache of the client device for later presentation. A cache device may be implemented on non-transitory or transitory hardware of the client device. At step 922, the streaming application plays segment 3 from the cache. The steps in FIG. 9 may be repeated until the content item catches up to live.

FIG. 10 shows an exemplary embodiment 1000 for storing the missed segments in the cache based on the received segment metadata, in accordance with some embodiments of the disclosure. Embodiment 1000 is different from embodiment 900 in that the media server does not send the manifest to the streaming application, but the media server sends segment data to the streaming application when a request for a segment is received. Furthermore, the media server determines which of the missed segments of the content item need be sent to the streaming application and sends the determined segment data to the streaming application. Even though embodiment 1000 is described in the form of a segment, a frame may be used.

At step 1002, the user may request a presentation of the content item. At step 1004, the streaming application requests live streaming of the content item to the media server. At step 1006, the media server sends segment 1 of the content item to the streaming application.

At step 1008, the streaming application plays segment 1 from network address 1. At step 1010, the streaming application determines that playing of the content item lags behind the live streaming. At step 1012, the streaming application identifies the duration of the lag. At step 1014, the streaming application sends an indication to the media server that playing of the content item lags behind the live streaming.

At step 1016, upon receiving the indication, the media server determines a threshold based on the duration of the lag. At step 1018, the media server queries the database of the media server and determines that segment 2 has a priority level (e.g., 4) that is below a threshold. At step 1020, upon determining that segment 2 has the priority level that is below the priority threshold, the media server skips sending segment 2 data to the streaming application.

At step 1022, the media server identifies a segment of the content item that follows segment 2 and queries the database of the media server for the skippable bit value for segment 3. The media server determines that segment 3 has a priority level (e.g., 7) that is higher than the priority threshold (e.g., 5). At step 1024, upon determining that segment 3 has the priority level higher than the priority threshold, the media server sends segment 3 data to the streaming application. At step 1026, the streaming application receives segment 3 data from the media server and stores segment 3 data in the cache. At step 1028, the streaming application plays segment 3 from the cache. The process 1000 may continue until the content item is caught up to live.

FIG. 11 shows an illustrative process 1100 for catching up to live based on a user selection, in accordance with some embodiments of the disclosure. It should be noted that process 1100 may be performed by control circuitry 1404 of FIG. 14 as instructed by a streaming application that maybe performed on any devices 1502, 1504, 1506 of FIG. 15. In addition, one or more steps of process 1100 may be incorporated into or combined with one or more steps of any other process or embodiment (e.g., process 1200 of FIG. 12 and process 1300 of FIG. 13). The process 1100 may be performed in accordance with the embodiments discussed in connection with FIGS. 1-4.

In some embodiments, the user requests the live stream of the content item via the streaming application on the user device. In response to the user request, the streaming application requests the live streaming of the content item from the media server. At block 1102, the control circuitry generates the content item for live streaming. The content item includes one or more segments where each segment may have one or more frames.

At block 1104, the control circuitry determines whether playing of the content item lags behind the live streaming of the content item. One example of determining the lag is by calculating a hash of a segment of the content item. In some embodiments, the streaming application receives a manifest of the content item that contains information about (a) Uniform Resource Locator (URL) of the content item, (b) hash code, and (c) timestamp for each segment. The streaming application calculates a hash code of a live segment using a timestamp of the live segment. The streaming application also determines a hash code for a segment that is currently displayed based on the manifest. The streaming application compares the calculated hash code of the live segment to the determined hash code of the currently displayed segment. If there is a mismatch, then the streaming application determines that there is a lag between the live segment and the currently displayed segment.

At block 1106, if the control circuitry determines that playing of the content item lags behind the live streaming of the content item, then the streaming application generates one or more selectable "catching-up" options for display. The options include (a) catch up to live in a particular time period, (b) catch up to live immediately, and (c) stop the live streaming. On the other hand, if the control circuitry determines that playing of the content item does not lag behind the live streaming of the content item, then the streaming application does not present the user-selectable "catching-up" options for display.

The user-selectable options may include a graphical user interface element that prompts the user to select one of the presented options. At block 1108, the streaming application receives user input selecting one of the presented options. In some embodiments, the streaming application performs an action without receiving user input selecting the presented options. For example, based on the user profile data, the streaming application may perform one of the catching-up operations without receiving user input selecting any of the options (a), (b) or (c). The user profile data may include the user's preferred catching-up options and user history data on previously selected options.

At block 1110, if option (a) is selected, then the streaming application presents a sub-option for further user input. For example, the streaming application displays a drop-down menu or pop-up window that displays a list of values for the particular time period in the graphical user interface. In some embodiments, the graphical interface element may include a field where the user can provide a random value for the particular time period. The particular time period may be adjusted based on the user input. In some embodiments, the sub-option may be optional, and the list of values may be presented with the option (a) interface. In some embodiments, the streaming application determines a value for the particular time period based on user profile data and presents the system-configured values for display for the user to choose from. The user profile data includes user preference information for a preferred catching-up time period or past history of catching-up patterns. The streaming application may pre-populate the user's preferred particular time period in the sub-option.

Based on the selected particular time period, the streaming application skips a presentation of a portion of the missed segments, such that the playing of the content item eventually catches up to live in the particular time period. In one embodiment, the streaming application may skip a portion of the missed segment based on the user profile data without receiving user input specifying the particular time period.

At block 1112, if option (b) is selected, then the streaming application presents a frame corresponding to the live streaming of the content item (e.g., live frame), such that the playing of the content item catches up to live immediately. The missed frames due to the lag will not be displayed.

At block 1114, if option (c) is selected, then the streaming application presents a frame of the content item for when the content item was paused immediately before when the user-selectable options were presented. Selecting option (c) does not trigger catching up of the content item, such that the playing of the content item does not match the live streaming. The streaming application will continue presenting the content item that is behind the live streaming without ever catching up, and therefore, the content item will remain behind the live streaming.

FIG. 12 shows an illustrative process for catching up to live based on a skippable bit value, in accordance with some embodiments of the disclosure. It should be noted that process 1200 may be performed by control circuitry 1404 of FIG. 14 as instructed by a streaming application that maybe performed on any devices 1502, 1504, 1506 of FIG. 15. In addition, one or more steps of process 1200 may be incorporated into or combined with one or more steps of any other process or embodiment (e.g., process 1100 of FIG. 11 and process 1300 of FIG. 13). The process 1200 may be performed in accordance with the embodiments discussed in connection with FIGS. 5-8.

In some embodiments, the user requests the live stream of the content item via the streaming application on the user device. In response to the user request, the streaming application requests the live streaming of the content item from the media server. At block 1202, in response to the request to live stream the content item, the control circuitry receives a manifest of the content item. The manifest identifies a plurality of sequential segments of the content item. For each segment of the content item, the manifest contains information about a respective skippable bit value and a respective network address.

At block 1204, based on the manifest, the control circuitry identifies a first segment as a last-played segment of the content item on the user device. The control circuitry also identifies a second segment of the content item as a segment that follows the first segment of the content item in the plurality of sequential segments of the content item.

At block 1206, the control circuitry determines that playing of the content item lags behind the live streaming of the content item. In one embodiment, unstable network connectivity causes the lag in the live streaming of the content item. When playing of the content item is paused, the control circuitry determines that the playing of the content item lags behind the live streaming of the content item.

At block 1208, the control circuitry determines whether a respective skippable bit value of the second segment comprises a first skippable bit value based on the manifest of the content item. The first skippable bit value may indicate that the respective segment may be skipped for presentation (e.g., enabled skippable bit). At block 1210, upon determining that the respective skippable bit value of the second segment comprises the first skippable bit value, the control circuitry skips requesting data from a respective network address of the second segment. Skipping a presentation of a segment may cause the content item to catch up to the live streaming.

At block 1212, upon determining that the respective skippable bit value of the second segment does not comprise the first skippable bit value, the control circuitry requests data from a respective network address of the second segment. The control circuitry plays the second segment from the respective network address of the second segment on the user device. The control circuitry identifies a third segment as a subsequent segment that follows the second segment of the content item in the plurality of sequential segments of the content item.

At block 1214, the control circuitry determines whether a respective skippable bit value of the third segment comprises a second skippable bit value based on the manifest. The second skippable bit value may indicate that a presentation of a respective segment cannot be skipped (e.g., disabled skippable bit).

At block 1216, upon determining that the respective skippable bit value of the third segment comprises the second skippable bit value, the control circuitry requests data from a respective network address of the third segment. The control circuitry plays the third segment from the respective network address of the third segment on the user device.

At block 1218, upon determining that the respective skippable bit value of the third segment does not comprise the second skippable bit value, the control circuitry skips requesting data from the respective network of the third segment. In one embodiment, the third segment comprises the first skippable bit value different from the second skippable bit value. In another embodiment, the third segment comprises a skippable bit value that is different from both the first skippable bit value and the second skippable bit value.

In some embodiments, the control circuitry identifies a fourth segment of the content item as a segment that follows the third segment of the content item in the plurality of sequential segments of the content item. Upon determining that the playing of the content item no longer lags behind the live streaming, the control circuitry requests data from a respective network address of the fourth segment of the content item regardless of a respective skippable bit value of the fourth segment. For example, even though the fourth segment comprises the first skippable bit value (e.g., enabled skippable bit), the control circuitry nevertheless plays the fourth segment of the content item based on the data requested from the respective network address of the fourth segment of the content item, because the content item is no longer lagging.

FIG. 13 shows an illustrative process for caching a time-shifted frame to catch up to live, in accordance with some embodiments of the disclosure. It should be noted that process 1300 may be performed by control circuitry 1404 of FIG. 14 as instructed by the streaming application that maybe performed on any devices 1502, 1504, 1506 of FIG. 15. In addition, one or more steps of process 1300 may be incorporated into or combined with one or more steps of any other process or embodiment (e.g., process 1100 of FIG. 11 and process 1200 of FIG. 12). The process 1300 may be performed in accordance with the embodiments discussed in connection with FIGS. 9-10.

In some embodiments, the user requests the live stream-ing of the content item via the streaming application on the user device. In response to the user request, the streaming application requests the live streaming of the content item to the media server. At block 1302, in response to the request to live stream the content item, the control circuitry receives a manifest of the content item. The manifest identifies a plurality of sequential segments of the content item. Each segment is associated with a timestamp, which identifies the location of each segment in the content item. The manifest contains information about a network address and a priority level value for each segment. The manifest may be stored in a database of the media server. In some embodiments, sending the manifest to the streaming application is optional and may only be performed when the lag is identified by the streaming application.

In one embodiment, the media server assigns a priority level to each segment of the content item based on a number of replays of the segment in a predetermined time period. For example, the media server calculates the number of times the segment is streamed or scheduled to be streamed in a particular time period. As an example, replays of a previously streamed segment affect the priority level of a respective segment adversely because the user is likely to have been exposed to the particular segment previously, and the particular segment may not need to be presented to the user again.

In another embodiment, the media server assigns a pri-ority level to each segment of the content item based on a respective relevance level of the segment. For example, the media server determines a respective relevance level of a segment to the user based on the user profile data, such that a segment of a higher relevance (e.g., matching user's preference) is determined to be more relevant to the user than other scenes. If a particular segment is of high impor-tance to the user (e.g., action scene), then the media server assigns a higher priority level value to the particular segment than a segment that is determined to be of lower relevance to the user (e.g., romance scene).

In a related embodiment, the media server assigns a priority level to each segment of the content item based on a respective importance level of the segment in the context of the content item. For example, the media server deter-mines a respective importance level of a segment, such that the segment includes scenes that are more important to the content itself than other scenes of the content (e.g., climax scene vs. ending credits). The media server assigns a higher priority level value to a particular segment that has a higher importance level than a segment with a lower importance level.

At block 1304, the control circuitry determines whether the playing of the content item lags behind the live streaming of the content item. If the playing of the content item does not lag behind the live streaming of the content item, then the control circuitry streams the content item in real time at block 1320. If the playing of the content item lags behind the live streaming of the content item, process 1300 continues to block 1306.

At block 1306, the control circuitry identifies a duration of the lag from the timestamp of the segment included in the manifest. The control circuitry calculates the duration of the lag based on a time difference between when the content item is paused and when the content item is resumed. If there is more than one lag, the control circuitry calculates the total length of the lags.

At block 1308, the control circuitry selects a priority threshold based on the duration of the lag. In some embodi-ments, the priority threshold may be proportional to the duration of the lag. For example, if the duration of the lag is extended, then the priority threshold becomes high as the streaming application may present only a few of the highly important segments to catch up within a limited amount of time.

At block 1310, the control circuitry identifies a set of segments of the plurality of segments where a total length of the set of segments matches the duration of the lag. For example, when there is more than one lag, the control circuitry identifies, based on the manifest, all of the missed segments to match the total length of the delay.

At block 1312, the control circuitry identifies a segment that has a priority level value that is higher than the priority threshold based on the received manifest from the media server. In some embodiments, the media server sends the priority level information of the identified segment upon receiving an indication of the lag from the streaming appli-cation at block 1312. For example, upon receiving an indication of the lag, the media server calculates priority level information for the segments that fall within the total length of the lag to minimize the pre-calculation process of the priority level values and the network data transmission. This way, the media server does not have to calculate priority level values for all of the segments of the content item. Instead, the media server only calculates the priority level values for a limited number of segments that matches the length of the delay.

At block 1314, the control circuitry retrieves a respective segment of the subset using a respective network address. The control circuitry skips retrieving a respective segment of the subset with a priority level lower than the priority threshold. At block 1316, the control circuitry stores each of the retrieved subset of the segments in a cache of the user device. The control circuitry may store the identified seg-ments until the content item is caught up to live. The segments with priority level values lower than the priority threshold may not be stored in the cache as the presentation of those segments will be skipped.

At block 1318, the control circuitry plays each of the stored subsets of segments from the cache. The control circuitry fetches the cached segments and causes the content item to catch up to live.

In one embodiment, upon determining that the playing of the content item no longer lags behind the live streaming, the control circuitry requests data from a respective network address of the set of segments of the plurality of content items regardless of a respective priority level value of the set of segments that follow the stored subset of the plurality of sequential segments in the content item, and stores the retrieved set of segments in the cache of the user device. For example, even though the retrieved set of segments com-prises a priority level value that is lower than the priority threshold, the control circuitry nevertheless stores the retrieved set of segments in the cache and plays the set of segments from the cache. In another embodiment, upon determining that the playing of the content item no longer lags behind the live streaming, the control circuitry does not cache any of the segments.

FIG. 14 depicts a generalized embodiment of an illustrative device (e.g., user device 102, 202, 302, 402) that displays a live video stream. User equipment device 1400 may be any of a plurality of user devices such as a smartphone, a tablet, personal computer, set-top box, etc. (discussed further below with respect to FIG. 15). User equipment device 1400 may receive the video stream and data via input/output (hereinafter "I/O") path 1402. I/O path 1402 may provide the video stream (e.g., on-demand programming, Internet content, content available over LAN or WAN, and the like) and data to control circuitry 1404, which includes processing circuitry 1406 and storage 1408. Control circuitry 1404 may be used to send and receive commands, requests, and other suitable data using I/O path 1402. I/O path 1402 may connect control circuitry 1404 (and specifically processing circuitry 1406) to one or more communications paths (described below in relation to FIG. 15). I/O functions may be provided by one or more of these communications paths but are shown as a single path in FIG. 14 to avoid overcomplicating the drawing.

Control circuitry 1404 may be based on any suitable processing circuitry such as processing circuitry 1406. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 1404 executes instructions for an application stored in memory (e.g., memory 1408). Specifically, control circuitry 1404 may be instructed by a media application to perform the functions discussed above and below. For example, the media application may provide instructions to control circuitry 1404 to request a video stream from server. Moreover, the media application may also collect user profile information and send to server prior to the encoding process. In some implementations, any action performed by control circuitry 1404 may be based on instructions received from the media application.

Control circuitry 1404 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 1408) may also be provided. Control circuitry 1404 may also include scaler circuitry for upconverting and downconverting content into the preferred output format of user equipment device 1400, and converter circuitry for converting between digital and analog signals. The tuning and encoding circuitry may be used by user equipment device 1400 to receive, play, and buffer content. The circuitry described herein, including, for example, the tuning, audio generating, encoding, decoding, encrypting, decrypting, scaler, and analog/digital circuitry, may be implemented using software running on one or more general purpose or specialized processors. If storage 1408 is provided as a separate device from user equipment device 1400, the tuning and encoding circuitry may be associated with storage 1408.

Storage 1408 may be any device for storing electronic data, such as random-access memory, solid state devices, quantum storage devices, hard disk drives, non-volatile memory or any other suitable fixed or removable storage devices, and/or any combination of the same. Control circuitry 1404 may allocate portions of storage 1408 for various purposes such as caching application instructions, recording media assets, storing portions of a media asset, buffering segments of media, etc. As described herein, storage 1408 may be used to store one or more LUTs storing a number of MAC addresses associated with a plurality of user equipment devices and their corresponding profile information.

A user may send instructions to control circuitry 1404 using user input interface 1410. User input interface 1410 may be any suitable user input interface, such as a remote control, mouse, trackball, keypad, keyboard, touchscreen, touchpad, stylus input, joystick, voice recognition interface, or other user input interfaces. Instructions to control circuitry 1404 may be transmitted through I/O path 1402, which could consist of a video tracking and detection mechanism, Internet of Things (IoT) and home automation triggers, emergency alert systems, and software or hardware communication pipelines and/or notification centers.

Display 1412 may be provided as a stand-alone device or integrated with other elements of each one of user equipment device 1400. For example, display 1412 may be a touchscreen or touch-sensitive display, a projector, or a casting device. In such circumstances, user input interface 1410 may be integrated with or combined with display 1412. Display 1412 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 1412. In some embodiments, the graphics processing circuitry may be external to processing circuitry 1406 (e.g., as a graphics processing card that communicates with processing circuitry 1406 via I/O path 1402) or may be internal to processing circuitry 1406 or control circuitry 1404 (e.g., on a same silicone die as control circuitry 1404 or processing circuitry 1406). In some embodiments, the graphics processing circuitry may be used to receive, display, and play content.

Speakers 1414 may be provided as integrated with other elements of user equipment device 1400 or may be stand-alone units. The audio component of videos and other content displayed on display 1412 may be played through speakers 1414. In some embodiments, the audio may be distributed to a receiver (not shown), which processes and outputs the audio via speakers 1414. The speakers 1414 may be part of, but not limited to, a home automation system.

Streaming applications may be, for example, stand-alone applications implemented on user devices. For example, the streaming application may be implemented as software or a set of executable instructions, which may be stored in non-transitory storage 1408 and executed by control circuitry 1404 of a user device 1502, 1504, 1506. In such an approach, instructions of the streaming application are stored locally (e.g., in storage 1408), and data for use by the application is downloaded on a periodic basis (e.g., from an out-of-band feed, from an Internet resource, or using another suitable approach). Control circuitry 1404 may retrieve instructions of the streaming application from storage 1408 and process the instructions to generate any of the displays discussed herein. Based on the processed instructions, control circuitry 1404 may determine what action to perform when user input is received from input interface 1410.

FIG. 15 depicts an exemplary media system in accordance with some embodiments of the disclosure, in which user equipment device 102, 202, 302, 402, and user equipment device 1400 can be implemented in the media system 1500 of FIG. 15 as user television equipment 1502, user computer equipment 1504, wireless user communications device 1506, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 1502 may include a set-top box, an integrated receiver decoder (IRD) for handling satellite television, a television set, a digital storage device, or other user television equipment. One or more of these devices may be integrated to be a single device, if desired. User computer equipment 1504 may include a PC, a laptop, a streaming content aggregator, a PC media center, or other user computer equipment. It may include devices like digital assistance, smart speakers, and/or home automation. Wireless user communications device 1506 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 1500, there are typically more than one of each type of user equipment, but only one of each is shown in FIG. 15 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 1514. Namely, user television equipment 1502, user computer equipment 1504, and wireless user communications device 1506 are coupled to communications network 1514 via communications paths 1508, 1510, and 1512, respectively. Communications network 1514 is used by the user equipment to obtain the video stream. Communications network 1514 may be one or more networks including the Internet, a mobile phone network, ad-hoc network, or other types of communications network or combination of communications networks. Paths 1508, 1510, and 1512 may separately or together include one or more communications paths, including any suitable wireless communications path. Path 1512 is drawn as a dotted line to indicate it is a wireless path. Communications with the user equipment may be provided by one or more of these communications paths but are shown as a single path in FIG. 15 to avoid overcomplicating the drawing. The user equipment devices may communicate with each other directly through an indirect path via communications network 1514.

System 1500 includes content item source 1516 and content item data source 1518 coupled to communications network 1514 via communications paths 1520 and 1522, respectively. Paths 1520 and 1522 may include any of the communications paths described above in connection with paths 1508, 1510, and 1512. Communications with the content item source 1516 and content item data source 1518 may be exchanged over one or more communications paths but are shown as a single path in FIG. 15 to avoid overcomplicating the drawing. In addition, there may be more than one of each of content item source 1516 and content item data source 1518, but only one of each is shown in FIG. 15 to avoid overcomplicating the drawing. In some embodiments, content item source 1516 and content item data source 1518 are integrated as one source device. Although communications between sources 1516 and 1518 with user equipment are shown as through communications network 1514, in some embodiments, sources 1516 and 1518 may communicate directly with user equipment devices 1502, 1504, and 1506 via communications paths (not shown) such as those described above in connection with paths 1508, 1510, and 1512.

Content item source 1516 or content item data source 1518 may include one or more types of media distribution equipment such as a media server, cable system headend, satellite distribution facility, intermediate distribution facilities and/or servers, Internet providers, on-demand media servers, and other media providers. Content item source 1516 or content item data source 1518 may be the originator of media content or may not be the originator of media content. Content item source 1516 or content item data source 1518 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 1500 is intended to illustrate a number of approaches, or network configurations, by which user equipment devices and sources of media content and guidance data may communicate with each other for the purpose of accessing media and data related to the media. The configuration of the devices and paths in system 1500 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 1100, 1200 and 1300 can be performed on any of the devices shown in FIGS. 14-15. Additionally, any of the steps in processes 1100, 1200 and 1300 can be performed in any order, can be omitted, and/or can be combined with any of the steps from any other process.

23

What is claimed is:

1. A method comprising:

based on determining that a current play position of a content item consumed by a user device is delayed with respect to a live stream position of the content item, generating for display a user interface element comprising a plurality of options to catch up to live, wherein each of the plurality of options to catch up to live corresponds to a different duration over which the current play position of the content item catches up to the live stream position of the content item; and based on receiving a user input, via the user interface element, selecting a selected option of the plurality of options to catch up to live:

skipping presentation of a portion of the content item, such that the current play position of the content item catches up to the live stream position of the content item over the duration corresponding to the selected option.

2. The method of claim 1, wherein skipping presentation of the portion of the content item comprises:

receiving metadata for the content item;

based on the metadata, determining a first subset of segments of the content item having a first skippable bit value; and providing for display the first subset of segments of the content item.

3. The method of claim 1, wherein skipping presentation of the portion of the content item comprises:

determining a priority value for each segment of the content item;

determining a first subset of segments of the content item based on the respective priority values; and providing for display the first subset of segments of the content item.

4. The method of claim 1, wherein the plurality of options to catch up to live comprises a default option corresponding to a default duration of time over which the current play position of the content item catches up to the live stream position, wherein the default duration is determined based on a user profile corresponding to the user device.

5. The method of claim 1, wherein skipping presentation of the portion of the content item comprises skipping presentation of two or more non-consecutive segments of the content item.

6. The method of claim 2, wherein determining the first subset of segments further comprises determining the first subset of segments based on the duration corresponding to the selected option to catch up to live.

7. The method of claim 2, further comprising receiving a manifest comprising the metadata for the content item.

8. The method of claim 3, wherein determining the first subset of segments further comprises determining the first subset of segments based on the duration corresponding to the selected option to catch up to live.

9. The method of claim 3, further comprising:

receiving a manifest for the content item; and determining the priority value for each segment of the content item based on the manifest.

10. The method of claim 4, wherein the default duration is determined based on one or more of a user history, a content type corresponding to the content item, a time of day during which the content item is consumed by the user device, a network connectivity metric, or a hardware condition of the user device.

24

11. A system comprising:

control circuitry configured to:

based on determining that a current play position of a content item consumed by a user device is delayed with respect to a live stream position of the content item, generate for display a user interface element comprising a plurality of options to catch up to live, wherein each of the plurality of options to catch up to live corresponds to a different duration over which the current play position of the content item catches up to the live stream position of the content item; and input/output circuitry configured to:

based on receiving a user input, via the user interface element, selecting a selected option of the plurality of options to catch up to live:

skip presentation of a portion of the content item, such that the current play position of the content item catches up to the live stream position of the content item over the duration corresponding to the selected option.

12. The system of claim 11, wherein the input/output circuitry is further configured to skip presentation of the portion of the content item by:

receiving metadata for the content item;

based on the metadata, determining a first subset of segments of the content item having a first skippable bit value; and providing for display the first subset of segments of the content item.

13. The system of claim 11, wherein the input/output circuitry is further configured to skip presentation of the portion of the content item by:

determining a priority value for each segment of the content item;

determining a first subset of segments of the content item based on the respective priority values; and providing for display the first subset of segments of the content item.

14. The system of claim 11, wherein the plurality of options to catch up to live comprises a default option corresponding to a default duration of time over which the current play position of the content item catches up to the live stream position, wherein the control circuitry is further configured to determine the default duration based on a user profile corresponding to the user device.

15. The system of claim 11, wherein the input/output circuitry is further configured to skip presentation of the portion of the content item by skipping presentation of two or more non-consecutive segments of the content item.

16. The system of claim 12, wherein the control circuitry is further configured to determine the first subset of segments based on the duration corresponding to the selected option to catch up to live.

17. The system of claim 12, wherein the input/output circuitry is further configured to receive a manifest comprising the metadata for the content item.

18. The system of claim 13, wherein the input/output circuitry is further configured to determine the first subset of segments based on the duration corresponding to the selected option to catch up to live.

19. The system of claim 13, wherein the input/output circuitry is further configured to:

receive a manifest for the content item; and determine the priority value for each segment of the content item based on the manifest.

20. The system of claim 14, wherein the default duration is determined based on one or more of a user history, a content type corresponding to the content item, a time of day during which the content item is consumed by the user device, a network connectivity metric, or a hardware condition of the user device.

* * * * *